(12) United States Patent
Lablans

(10) Patent No.: US 7,865,806 B2
(45) Date of Patent: Jan. 4, 2011

(54) METHODS AND APPARATUS IN FINITE FIELD POLYNOMIAL IMPLEMENTATIONS

(76) Inventor: Peter Lablans, 8 Harvey Ct., Morris Township, NJ (US) 07960

( * ) Notice: Subject to any disclaimer, the term of this patent is extended or adjusted under 35 U.S.C. 154(b) by 982 days.

(21) Appl. No.: 11/679,316

(22) Filed: Feb. 27, 2007

(65) Prior Publication Data

US 2007/0208796 A1  Sep. 6, 2007

Related U.S. Application Data

(60) Provisional application No. 60/779,068, filed on Mar. 3, 2006.

(51) Int. Cl.
*H03M 13/00* (2006.01)
(52) U.S. Cl. .................. 714/781; 714/784; 708/492
(58) Field of Classification Search ................ 714/781, 714/784; 708/492
See application file for complete search history.

(56) References Cited

U.S. PATENT DOCUMENTS

| | | | |
|---|---|---|---|
| 3,515,805 A | 6/1970 | Fracassi et al. | |
| 4,642,808 A | 2/1987 | Baggen | |
| 4,703,485 A | 10/1987 | Patel | |
| 5,768,168 A | 6/1998 | Im | |
| 5,812,438 A | 9/1998 | Lan et al. | |
| 6,003,057 A | 12/1999 | Dworkin et al. | |
| 6,141,786 A | 10/2000 | Cox et al. | |
| 6,259,388 B1 | 7/2001 | Zhao | |
| 6,473,779 B1 | 10/2002 | Wolf | |
| 6,550,035 B1 | 4/2003 | Okita | |
| 6,587,864 B2 | 7/2003 | Stein et al. | |
| 6,725,415 B2 | 4/2004 | Ishiwaki | |
| 6,760,742 B1 | 7/2004 | Hoyle | |
| 6,766,345 B2 * | 7/2004 | Stein et al. ............ | 708/492 |
| 2004/0054703 A1 | 3/2004 | Huber et al. | |
| 2004/0078408 A1 | 4/2004 | Miller et al. | |
| 2006/0123325 A1 | 6/2006 | Wilson et al. | |

OTHER PUBLICATIONS

Shu Lin, et al., Error Control Coding, 2004 Pearson Education, Upper Saddle River, NJ, USA, pp. 148, 149, 150, 153 and 180.
John Gill, EE 387 #18 Handout #37, Stanford University, 16 pages, downloaded from Internet, no longer available.
Bernard Sklar, Reed-Solomon Codes, no date, downloaded from http://informit.staging.informit.mttech.com/content/images/art_sklar7_reed-solomon/elementLinks/art_sklar7_reed-solomon.pdf.
Hsie-Chia Chang, et al., "A High Speed Reed-Solomon decoder chip using inversionless decomposed architecture for Euclidean algorithm", 2002 European Solid-State Circuits Conference, Firenze, Italy, p. 519-522.
The Mathworks Communications Blockset: Scrambler Block 2006, downloaded from http://www.mathworks.com/access/helpdesk/help/toolbox/commblks/ref/scrambler.html.

(Continued)

*Primary Examiner*—Guy J Lamarre
(74) *Attorney, Agent, or Firm*—Diehl Servilla LLC

(57) ABSTRACT

Methods and apparatus reducing the number of multipliers in Galois Field arithmetic are disclosed. Methods and apparatus for implementing n-valued Linear Feedback Shift Register (LFSR) based applications with a reduced number of multipliers are also disclosed. N-valued LFSRs with reduced numbers of multipliers in Fibonacci and in Galois configuration are demonstrated. Multiplier reduction methods are extended to n-valued functions with more than 2 inputs. Methods to create multiplier reduced multi-input n-valued function truth tables are disclosed. Methods and apparatus to implement these truth tables with a limited number of n-valued inverters are also disclosed. Scrambler/descrambler combinations with adders and multipliers over $GF(2^p)$ are provided. Communication, data storage and digital rights management systems using multiplier reduction methods and apparatus or the disclosed scrambler/descrambler combination are also provided.

19 Claims, 26 Drawing Sheets

OTHER PUBLICATIONS

The Mathworks Communications Blockset: Descrambler Block 2006, downloaded from http://www.mathworks.com/access/helpdesk/help/toolbox/commblks/ref/descrambler.html.

The Mathworks, Communications Blockset for Use with Simulink, User's Guide, version 2.0, 2000, p. 4-150 and 4-151.

The Mathworks, Communications Blockset for Use with Simulink, User's Guide, version 2.0, 2000, p. 4-399 and 4-400.

The Mathworks, MatLab 7.1 R14, Communication Blockset, Help Files, Decscrambler, 2005, 3 pages.

* cited by examiner

METHODS AND APPARATUS IN FINITE FIELD POLYNOMIAL IMPLEMENTATIONS

CROSS-REFERENCE TO RELATED APPLICATIONS

This application is a continuation-in-part of U.S. patent application Ser. No. 10/935,960 filed on Sep. 8, 2004 which claims the benefit of U.S. provisional patent application Ser. No. 60/547,683 filed on Feb. 25, 2004 and of U.S. patent application Ser. No. 11/618,986 filed on Jan. 2, 2007 being a continuation-in-part of U.S. patent application Ser. No. 10/935,960 filed on Sep. 8, 2004. This application also claims the benefit of U.S. Provisional Application No. 60/779,068, filed Mar. 3, 2006, which is incorporated herein by reference.

BACKGROUND OF THE INVENTION

The present invention relates to implementing finite field polynomial arithmetic expressions by Linear Feedback Shift Registers in error correcting coders. More in particular it relates to reducing or eliminating multipliers by modifying the functions in the finite field arithmetic expressions.

Linear Feedback Shift Registers or LFSRs may be considered one of the most widely applied fundamental logic or switching circuits in present day digital applications. Binary logic LFSRs are widely used as scramblers, descramblers, sequence generators and provide arithmetical execution in GF(2). Also known are non-binary LFSRs. Non-binary LFSRs are applied in for instance error correction coding applications, such as in Reed Solomon (RS) codes for implementing polynomial expressions over GF(n). A non-binary LFSR in a coder usually performs a polynomial calculation, more in particular a polynomial division. Non-binary LFSRs in coding are for instance described in Galois Field arithmetic as provided in the book: Error Control Coding, $2^{nd}$ edition, by Shu Lin and Daniel J. Costello Jr.; Pearson Prentice Hall 2004.

Multi-valued LFSRs are used to generate for instance check symbols in coding and error correcting applications. A multi-valued LFSR, unless it strictly requires addition or subtraction will require multiplication over GF(n), wherein a multiplier usually represents a coefficient of a term in a polynomial over GF(n). Multiplication is a step in a multi-valued LFSR before an addition can be executed and requires additional circuitry in multi-valued LFSR apparatus. Accordingly this may require higher clock speeds in calculations and more circuitry, thus making prior art multi-valued LFSRs more expensive, more power consuming and less efficient.

Multipliers are known to make machine calculations slower and more expensive. Multipliers in LFSR appear because of coefficients of terms of factors in irreducible polynomials.

There are known efforts to make executing a multi-valued LFSR easier. For instance in U.S. patent application with publication number 20040054703 by Huber et al., filed on Oct. 22, 2003 and entitled: "Method and device for generating a pseudo-random sequence using a discrete logarithm," ("Huber" hereafter) provide a method wherein a multiplication is replaced by calculating a discrete logarithm in a multi-valued LFSR and wherein the multi-valued LFSR the addition function in a Fibonacci LFSR is replaced by a discrete logarithm function and a multiplication is replaced by an addition. The method as disclosed in "Huber" does not address the issues of clock speed and additional components.

Accordingly methods and apparatus for implementing a multi-valued LFSR using no or a reduced number of multipliers are required.

SUMMARY OF THE INVENTION

The present invention provides novel methods, coder and system for performing finite field polynomial calculations over GF(n) by an n-valued LFSR with no or almost no multipliers over GF(n), thus lowering a required clock speed, requiring fewer components and providing higher efficiencies.

In accordance with one aspect of the present invention a method is provided for performing a finite field polynomial calculation over GF(n) with n>2 on k n-valued symbols with k>1 comprising: inputting on an input the k n-valued symbols to an n-valued Linear Feedback Shift Register (LFSR), the n-valued LFSR having a n-valued logic function with at least two inputs and an output, the n-valued logic function not being an adder over GF(n), and each of the at least two inputs not having an n-valued inverter; and outputting at least one n-valued symbol on an output.

In accordance with another aspect of the present invention a method is provided wherein the finite field polynomial calculation is a division.

In accordance with a further aspect of the present invention a method is provided wherein an n-valued symbol is not represented by binary symbols.

In accordance with a further aspect of the present invention a method is provided wherein the n-valued LFSR is an LFSR in Galois configuration.

In accordance with another aspect of the present invention a method is provided wherein the n-valued logic function has more than 2 inputs.

In accordance with a further aspect of the present invention a method is provided wherein the finite field polynomial calculation is implemented in a coder.

In accordance with another aspect of the present invention a method is provided wherein the n-valued coder is a Reed Solomon coder.

In accordance with a further aspect of the present invention a method is provided wherein the n-valued logic function has no n-valued inverter at the output.

In accordance with another aspect of the present invention a method is provided wherein the n-valued coder is a Cyclic Redundancy Check (CRC) coder.

In accordance with a further aspect of the present invention an n-valued coder is provided with n>2 enabled for performing a finite field polynomial calculation over GF(n) comprising: an input; an n-valued Linear Feedback Shift Register (LFSR) using a n-valued logic function not being an adder over GF(n), the n-valued logic function having at least two inputs and an output; and the n-valued function not having n-valued inverters at the at least two inputs; and an output.

In accordance with another aspect of the present invention an n-valued coder is provided wherein the n-valued coder is a Reed Solomon coder.

In accordance with a further aspect of the present invention an n-valued coder is provided wherein the n-valued LFSR is an LFSR in Galois configuration.

In accordance with another aspect of the present invention an n-valued coder is provided wherein the n-valued coder is a Cyclic Redundancy Check (CRC) coder.

In accordance with a further aspect of the present invention an n-valued coder is provided wherein the finite field polynomial calculation over GF(n) is a division.

In accordance with another aspect of the present invention an n-valued coder is provided wherein the n-valued LFSR is an LFSR in Fibonacci configuration.

In accordance with a further aspect of the present invention a system is provided having a n-valued coder with n>2 enabled for performing a finite field polynomial calculation over GF(n) the n-valued coder comprising: an input; an n-valued Linear Feedback Shift Register (LFSR) using a n-valued logic function not being an adder over GF(n), the n-valued logic function having at least two inputs and an output; and the n-valued logic function not having n-valued inverters at the at least two inputs; and an output.

In accordance with another aspect of the present invention a system is provided wherein the n-valued coder is a Reed Solomon coder.

In accordance with a further aspect of the present invention a system is provided wherein the n-valued LFSR is an LFSR in Galois configuration.

In accordance with another aspect of the present invention a system is provided wherein the system is a communication system.

In accordance with a further aspect of the present invention a system is provided wherein the communication system is a wireless system.

In accordance with another aspect of the present invention a system is provided wherein the system is a data storage system.

In accordance with a further aspect of the present invention an LFSR based n-valued scrambler and descrambler are provided.

DESCRIPTION OF A PREFERRED EMBODIMENT

The inventor has shown elsewhere, such as in U.S. Non-Provisional patent application Ser. No. 10/935,960 filed on Sep. 8, 2004 entitled: TERNARY AND MULTI-VALUE DIGITAL SIGNAL SCRAMBLERS, DESCRAMBLERS AND SEQUENCE GENERATORS, and in a U.S. patent application being a continuation-in-part with Ser. No. 11/618,986 filed on Jan. 2, 2007 which are both incorporated by reference herein in their entirety, that it is possible to evaluate an n-valued expression (aa sc1 p) sc2 (bb sc3 q)=cc by an n-valued expression (aa sc4 bb)=cc. Herein sc1, sc2, sc3 and sc4 are n-valued switching functions; aa, and bb are n-valued variables; and p and q are n-valued constants.

As an illustrative example one can for instance use the expression: (aa×p)+(bb×q). Herein the function '×' is for instance a modulo-n multiplication and '+' is a modulo-n addition. Assume, for illustrative purposes that n=5. Also it is assumed that p=2 and q=4. One may also say that '×' is a multiplication in GF(n). This makes all multiplications in GF(n) with a constant being reversible inverters for all n.

Figure 1:
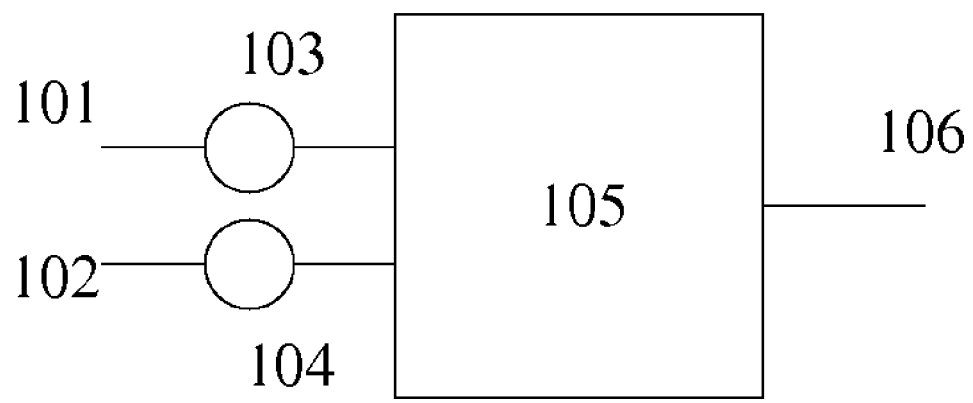
FIG. 1 is a diagram of a logic function with inverters and is known art.

An implementation of (aa×p)+(bb×q) is shown in FIG. 1. An adder is implemented by for instance a circuit 105. A first signal aa is provided on input 101 and a second signal bb is provided on input 102. As was shown in the cited patent application a multiplication p in an n-valued arithmetic is identical to applying a n-valued inverter. Accordingly 103 is an n-valued inverter representing a multiplication of aa by p and 104 is an n-valued inverter representing a multiplication of bb by q. A result (aa×p)+(bb×q) is provided on output 106.

The modulo-5 multiplication of (aa×2) can be represented by the 5-valued inverter [0 2 4 1 3] and the modulo-5 multiplication of (bb×4) can be represented by the 5-valued inverter [0 4 3 2 1]. The truth table of the modulo-5 multiplication and modulo-5 addition are provided in the truth tables of 'sc1' and 'sc2'.

| sc1 | 0 | 1 | 2 | 3 | 4 |
|---|---|---|---|---|---|
| 0 | 0 | 0 | 0 | 0 | 0 |
| 1 | 0 | 1 | 2 | 3 | 4 |
| 2 | 0 | 2 | 4 | 1 | 3 |
| 3 | 0 | 3 | 1 | 4 | 2 |
| 4 | 0 | 4 | 3 | 2 | 1 |

| sc2 | 0 | 1 | 2 | 3 | 4 |
|---|---|---|---|---|---|
| 0 | 0 | 1 | 2 | 3 | 4 |
| 1 | 1 | 2 | 3 | 4 | 0 |
| 2 | 2 | 3 | 4 | 0 | 1 |
| 3 | 3 | 4 | 0 | 1 | 2 |
| 4 | 4 | 0 | 1 | 2 | 3 |

The functions 'sc1' and 'sc2' are commutative. In that case it does not matter if one considers (aa sc1 bb) or (bb sc1 aa). However in many cases an n-valued function may be non-commutative. In those cases it does matter what order one uses in execution.

For the purpose of describing aspects of the present invention it is assumed that the variable or constant left of the function sc1 in (aa sc1 bb), in this case aa, determines a row of the truth table of sc1 and the variable or constant to the right of sc1, in this case bb, determines a column of the truth table. Accordingly two inputs aa and bb then determine the output or cc, generated by (aa sc1 bb) by the term in the row aa and the column bb in the truth table of sc1.

Referring to the expression (aa sc1 2) wherein sc1 is the × or modulo-5 multiplication, one can now say that this expression determines the column of truth table sc1 under value 2. One can see in the truth table of sc1 that the column under 2 is [0 2 4 1 3]. The term (bb sc 14) is the column in the truth table of sc1 under the value 4 which is the column with elements [0 4 3 2 1].

In other words: the expression (aa sc1 p) wherein p is a constant can be replaced by a column, or more in general by an inverter. The same applies to (bb sc1 q). The expression (aa×2) is the 5-valued inverter [0 2 4 1 3], named inverter Inv1 in FIG. 1. The expression (bb×4) is the 5-valued inverter [0 4 3 2 1], named Inv2 in FIG. 1.

Figure 2:
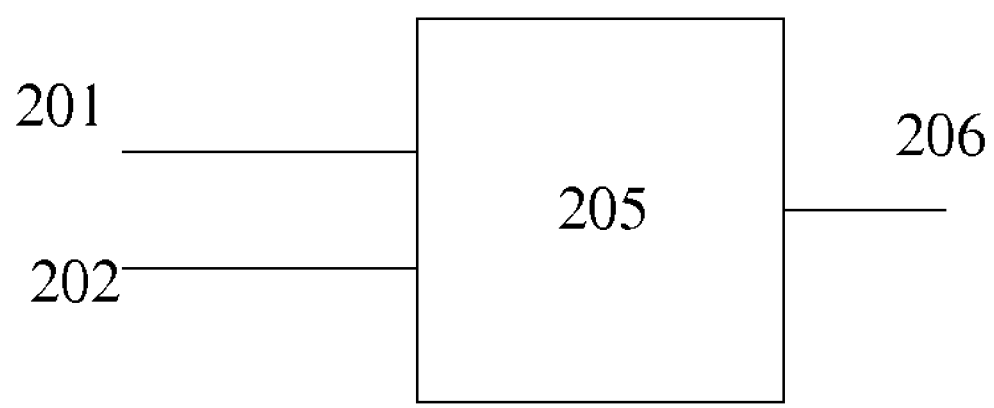
FIG. 2 is a diagram of an inverter reduced device and is known art.

As was shown in the cited patent application Ser. No. 10/935,960 one can now replace the expression (aa×2)+(bb×4) by the expression (aa sc4 bb). The resulting implementation is shown in FIG. 2. The variables aa and bb are provided on inputs 201 and 202, however the implementation has no inverters in the inputs. The circuit 205 implements a function sc4 and the result of (aa×2)+(bb×4) is provided on the output 206.

Per earlier assumption in (aa×2)+(bb×4) the term (aa×2) to the left of '+' determines the row of the truth table of '+'. In essence the standard input order [0 1 2 3 4] to the function '+' is being replaced by the inverter [0 2 4 1 3]. Or the row order [0 1 2 3 4] in 'sc2' is being replaced by row order [0 2 4 1 3]. The original row corresponding to input 0 remains row 0. The original row corresponding to input 1 is being replaced by the row corresponding to input 2. The original row corresponding to input 2 is being replaced by the row corresponding to input 4. The original row corresponding to input 3 is replaced by the row corresponding to input 1. Finally the original row corresponding to input 4 is replaced by the row corresponding to input 3. This then creates the truth table sc41, which is shown in the following table of a function sc41.

| sc41 | 0 | 1 | 2 | 3 | 4 |
|---|---|---|---|---|---|
| 0 | 0 | 1 | 2 | 3 | 4 |
| 1 | 2 | 3 | 4 | 0 | 1 |
| 2 | 4 | 0 | 1 | 2 | 3 |
| 3 | 1 | 2 | 3 | 4 | 0 |
| 4 | 3 | 4 | 0 | 1 | 2 |

By using sc41 one has replaced (aa×2)+(bb×4) replaced by aa sc41 (bb×4). One can further reduce the expression by replacing the columns in sc41 in order [0 1 2 3 4] by the columns in order [0 4 3 2 1], being the inverter that describes (bb×4). So in sc4 the column under 0 is column under 0 in sc41. The column under 1 in sc4 is the column under 4 in sc41. The column under 2 in sc4 is the column under 3 in sc41. The column under 3 in sc4 is the column under 2 in sc41 and the column under 4 in sc4 is the column under 1 in sc41. One can check the correctness in the truth table of sc4 in the following table.

| sc4 | 0 | 1 | 2 | 3 | 4 |
|-----|---|---|---|---|---|
| 0 | 0 | 4 | 3 | 2 | 1 |
| 1 | 2 | 1 | 0 | 4 | 3 |
| 2 | 4 | 3 | 2 | 1 | 0 |
| 3 | 1 | 0 | 4 | 3 | 2 |
| 4 | 3 | 2 | 1 | 0 | 4 |

It should be clear that sc4 is not a commutative function, and care should be taken of the order of inputs.

The reduction method applies to any n-valued expression (aa sc1 p) sc2 (bb sc3 q) wherein p and q are n-valued constants. Even if the expressions (aa sc1 p) and/or (bb sc3 q) can be represented by non-reversible inverters the method applies. However in that case the created reduced function will not be reversible.

Galois Field Arithmetic

Galois field arithmetic plays an important role in error correcting coding and is well known and described in many text books. For reason of notation in the present invention the description of encoding in Galois Field arithmetic as provided in the book: Error Control Coding, $2^{nd}$ edition, by Shu Lin and Daniel J. Costello Jr.; Pearson Prentice Hall 2004 (herein "Lin-Costello") will be used here.

Polynomial arithmetic can be expressed in LFSR in Fibonacci or Galois configuration. In cyclic codes one often sees the Galois representation for multiplication or encoding. The reason for this is that execution of a Galois LFSR may require fewer clock cycles than an equivalent Fibonacci LFSR.

Figure 3:
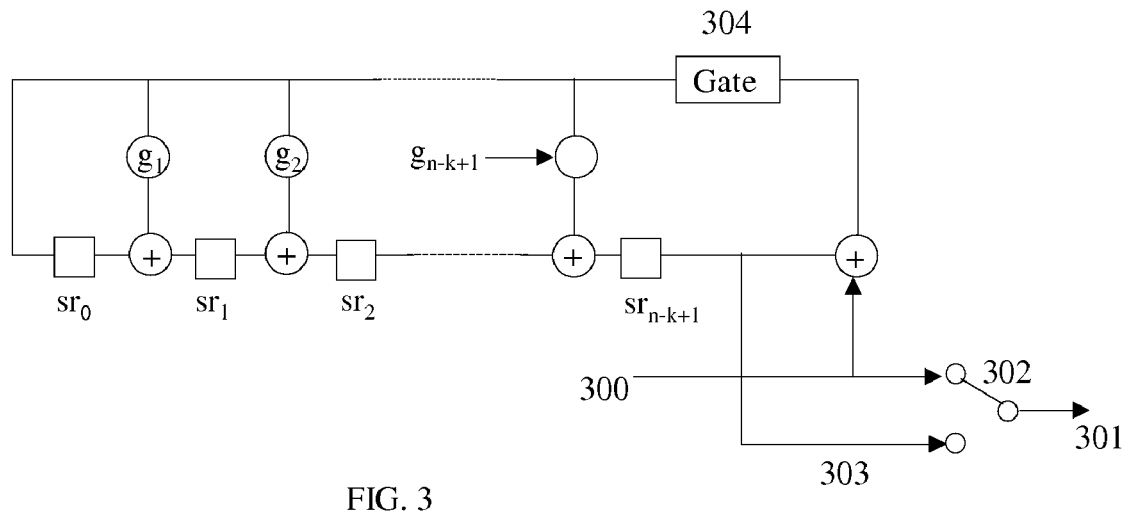
FIG. 3 is a diagram of a Reed Solomon coder and is known art.
Figure 5:
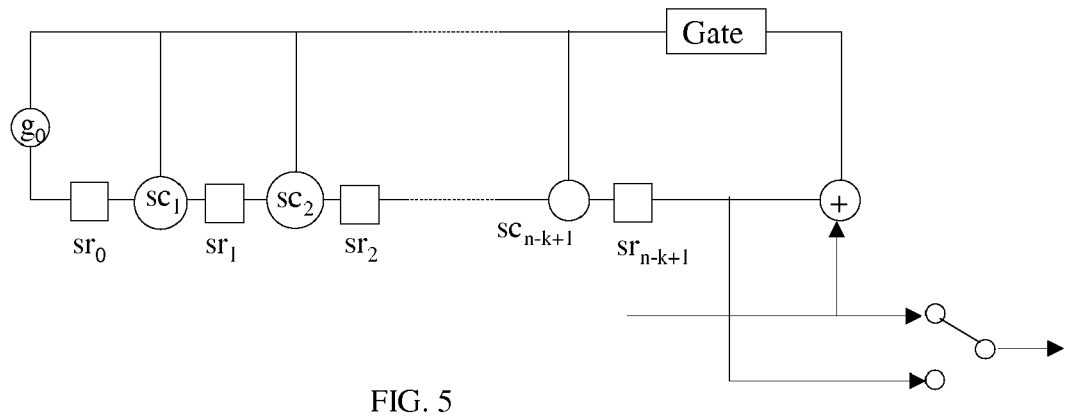
FIG. 5 is a diagram of a Reed Solomon coder in accordance with an aspect of the present invention.

The diagram in FIG. 3 is often used for the non-binary encoding circuit with generator polynomial: $g(X)=1+g_1 X^2+ \ldots +g_{n-k-1}X^{n-k-1}+^{n-k}$. FIG. 3 is from "Lin-Costello" page 147. FIG. 5.1. Though it is created for a binary code it also applies to an n-valued RS-code. This is shown in "Lin-Costello" FIG. 7.1 on page 239.

The diagram of FIG. 3 has as an input a message comprised of multi-valued symbols, or a series of bits each of which represent a multi-valued symbol inputted on 300. The code is systematic so the message is outputted on output 301 as part of a codeword when switch 302 is in a first position. During the time of input the digits of the codeword (which can be non-binary) are shifted into the LFSR when the Gate 304 is letting the symbols pass. The symbols are multiplied by the terms g1, g2 etc and summed with the content of preceding shift register elements (such as sr0, sr1, sr2, etc). At the next clock-signal (which is not shown but is assumed to be present) the outputs of the summers or adders is shifted as the new value of the shift register elements. After all symbols of the message have been passed the switch 302 is set from message to check symbols. The Gate 304 does not let pass any further symbols from that moment. The symbols in the shift register are then appended to the code-word as check symbols and outputted through 303 via switch 302 on output 301.

Figure 4:
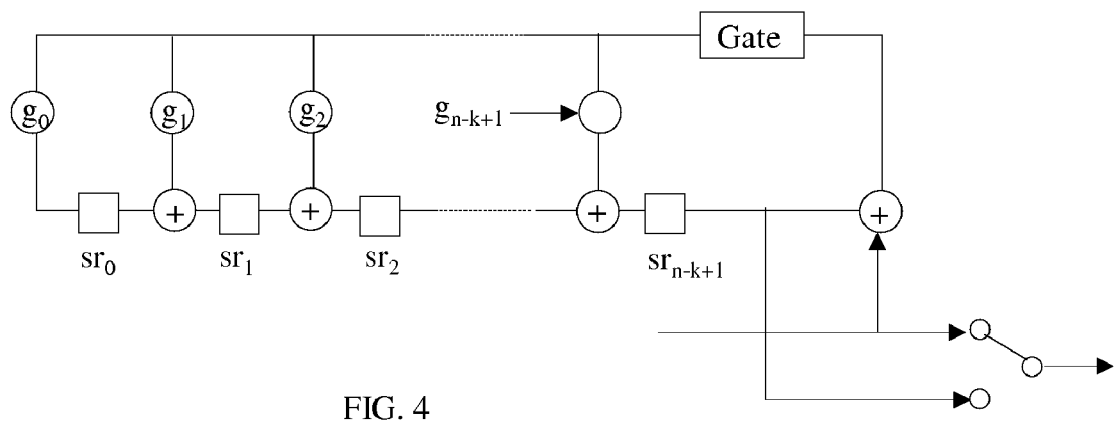
FIG. 4 is another diagram of a Reed Solomon coder and is known art.

FIG. 3 is an example of an n-valued LFSR based Reed Solomon coder. The coder takes in an n-valued number and through the LFSR determines a residue. In the here provided example the input to shift register element sr0 is not multiplied. FIG. 4 shows the diagram of FIG. 3 wherein also a multiplier g0 is provided for the symbol that is shifted into the first shift register element.

In accordance with one aspect of the present invention by using the method of function reduction as in the cited patent application Ser. No. 10/935,960 and explained again herein, it is possible to reduce the number of components in the coder as shown in the diagram of FIG. 5.

As is shown in FIG. 5 the encoder circuit has been realized by removing the n-valued multipliers g1, g2 etc and replacing the individual adders by the n-valued functions sc1, sc2, etc. These n-valued functions probably are non-commutative. Also one should keep in mind that Galois Field multiplication and addition may be different from the 'normal' addition and multiplication. In fact one may consider these functions just n-valued switching functions without being too concerned about their 'meaning'. In some cases one may find the feedback tap into sr0 also containing a multiplier g0 if g0 was not equivalent to an identity inverter.

As an illustrative example a (7,3) Reed-Solomon coder as published by Dr. Bernard Sklar (hereafter "Sklar") in his article: Reed-Solomon Codes as published on the WWW at the URL which is defined by URL <http_colon_slash_slash_nformit.staging.informit.mttech.com/content/images/art_sklar7_reed-solomon/elementLinks/art_sklar7_reed-solomon.pdf> which is incorporated herein by reference in its entirety. The diagram of FIG. 4 is somewhat similar to FIG. 9 in "Sklar", though in that figure only 4 shift register elements are used.

The polynomial describing the "Sklar" encoder is:

$g(x)=\alpha^3 X^0+\alpha^1 X+\alpha^0 X^2+\alpha^3 X^3+X^4$.

Multiplication and addition are defined in the extended finite field in $GF(2^3)$. The elements of the extended field can be described as powers of $\alpha$ or $\alpha^i$, wherein $\alpha$ is a root and a primitive element of the polynomial. It is known that the extended field of $GF(2^m)$ has the elements $\{0, \alpha^0, \alpha^1, \ldots, \alpha^{2m-2}\}$. There is sometimes a preference to find extensions of a binary field as this may make implementation possible in binary technology. For the methods of function reduction that is part of the present invention, finding Galois Field primitives is not required, though it may be required for certain error correcting coding and decoding purposes.

The truth tables of multiplication and addition in the extended field GF(8) are provided by the following two truth tables.

| add | 0 | $\alpha^0$ | $\alpha^1$ | $\alpha^2$ | $\alpha^3$ | $\alpha^4$ | $\alpha^5$ | $\alpha^6$ |
|-----|---|---|---|---|---|---|---|---|
| 0 | 0 | $\alpha^0$ | $\alpha^1$ | $\alpha^2$ | $\alpha^3$ | $\alpha^4$ | $\alpha^5$ | $\alpha^6$ |
| $\alpha^0$ | $\alpha^0$ | 0 | $\alpha^3$ | $\alpha^6$ | $\alpha^1$ | $\alpha^5$ | $\alpha^4$ | $\alpha^2$ |
| $\alpha^1$ | $\alpha^1$ | $\alpha^3$ | 0 | $\alpha^4$ | $\alpha^0$ | $\alpha^2$ | $\alpha^6$ | $\alpha^5$ |
| $\alpha^2$ | $\alpha^2$ | $\alpha^6$ | $\alpha^4$ | 0 | $\alpha^5$ | $\alpha^1$ | $\alpha^3$ | $\alpha^0$ |
| $\alpha^3$ | $\alpha^3$ | $\alpha^1$ | $\alpha^0$ | $\alpha^5$ | 0 | $\alpha^6$ | $\alpha^2$ | $\alpha^4$ |
| $\alpha^4$ | $\alpha^4$ | $\alpha^5$ | $\alpha^2$ | $\alpha^1$ | $\alpha^6$ | 0 | $\alpha^0$ | $\alpha^3$ |
| $\alpha^5$ | $\alpha^5$ | $\alpha^4$ | $\alpha^6$ | $\alpha^3$ | $\alpha^2$ | $\alpha^0$ | 0 | $\alpha^1$ |
| $\alpha^6$ | $\alpha^6$ | $\alpha^2$ | $\alpha^5$ | $\alpha^0$ | $\alpha^4$ | $\alpha^3$ | $\alpha^1$ | 0 |

| mult | 0 | $\alpha^0$ | $\alpha^1$ | $\alpha^2$ | $\alpha^3$ | $\alpha^4$ | $\alpha^5$ | $\alpha^6$ |
|------|---|---|---|---|---|---|---|---|
| 0 | 0 | 0 | 0 | 0 | 0 | 0 | 0 | 0 |
| $\alpha^0$ | 0 | $\alpha^0$ | $\alpha^1$ | $\alpha^2$ | $\alpha^3$ | $\alpha^4$ | $\alpha^5$ | $\alpha^6$ |
| $\alpha^1$ | 0 | $\alpha^1$ | $\alpha^2$ | $\alpha^3$ | $\alpha^4$ | $\alpha^5$ | $\alpha^6$ | $\alpha^0$ |
| $\alpha^2$ | 0 | $\alpha^2$ | $\alpha^3$ | $\alpha^4$ | $\alpha^5$ | $\alpha^6$ | $\alpha^0$ | $\alpha^1$ |
| $\alpha^3$ | 0 | $\alpha^3$ | $\alpha^4$ | $\alpha^5$ | $\alpha^6$ | $\alpha^0$ | $\alpha^1$ | $\alpha^2$ |
| $\alpha^4$ | 0 | $\alpha^4$ | $\alpha^5$ | $\alpha^6$ | $\alpha^0$ | $\alpha^1$ | $\alpha^2$ | $\alpha^3$ |
| $\alpha^5$ | 0 | $\alpha^5$ | $\alpha^6$ | $\alpha^0$ | $\alpha^1$ | $\alpha^2$ | $\alpha^3$ | $\alpha^4$ |
| $\alpha^6$ | 0 | $\alpha^6$ | $\alpha^0$ | $\alpha^1$ | $\alpha^2$ | $\alpha^3$ | $\alpha^4$ | $\alpha^5$ |

The diagram of FIG. 4 for this case, by applying the methods of the present invention, can now be reduced and modified by the diagram of FIG. 5.

The first multiplier of $X^0$, with factor $\alpha^3$ can be replaced by the inverter $[0\ \alpha^3\ \alpha^4\ \alpha^5\ \alpha^6\ \alpha^0\ \alpha^1\ \alpha^2]$. The multiplier $\alpha^1$ of X can be combined with the GF adder into a function sc1 with truth table sc1$t$ for all elements.

| sc1t | 0 | $\alpha^0$ | $\alpha^1$ | $\alpha^2$ | $\alpha^3$ | $\alpha^4$ | $\alpha^5$ | $\alpha^6$ |
|---|---|---|---|---|---|---|---|---|
| 0 | 0 | $\alpha^1$ | $\alpha^2$ | $\alpha^3$ | $\alpha^4$ | $\alpha^5$ | $\alpha^6$ | $\alpha^0$ |
| $\alpha^0$ | $\alpha^0$ | $\alpha^3$ | $\alpha^6$ | $\alpha^1$ | $\alpha^5$ | $\alpha^4$ | $\alpha^2$ | 0 |
| $\alpha^1$ | $\alpha^1$ | 0 | $\alpha^4$ | $\alpha^0$ | $\alpha^2$ | $\alpha^6$ | $\alpha^5$ | $\alpha^3$ |
| $\alpha^2$ | $\alpha^2$ | $\alpha^4$ | 0 | $\alpha^5$ | $\alpha^1$ | $\alpha^3$ | $\alpha^0$ | $\alpha^6$ |
| $\alpha^3$ | $\alpha^3$ | $\alpha^0$ | $\alpha^5$ | 0 | $\alpha^6$ | $\alpha^2$ | $\alpha^4$ | $\alpha^1$ |
| $\alpha^4$ | $\alpha^4$ | $\alpha^2$ | $\alpha^1$ | $\alpha^6$ | 0 | $\alpha^0$ | $\alpha^3$ | $\alpha^5$ |
| $\alpha^5$ | $\alpha^5$ | $\alpha^6$ | $\alpha^3$ | $\alpha^2$ | $\alpha^0$ | 0 | $\alpha^1$ | $\alpha^4$ |
| $\alpha^6$ | $\alpha^6$ | $\alpha^5$ | $\alpha^0$ | $\alpha^4$ | $\alpha^3$ | $\alpha^1$ | 0 | $\alpha^2$ |

The multiplier $\alpha^0$ of $X^2$ can be combined with the GF adder into sc2. The multiplier $\alpha^0$ is identical to multiplying with 1. Accordingly the truth table of sc2 is identical to the 'add' truth table. This is shown as truth table sc2$t$.

| sc2t | 0 | $\alpha^0$ | $\alpha^1$ | $\alpha^2$ | $\alpha^3$ | $\alpha^4$ | $\alpha^5$ | $\alpha^6$ |
|---|---|---|---|---|---|---|---|---|
| 0 | 0 | $\alpha^0$ | $\alpha^1$ | $\alpha^2$ | $\alpha^3$ | $\alpha^4$ | $\alpha^5$ | $\alpha^6$ |
| $\alpha^0$ | $\alpha^0$ | 0 | $\alpha^3$ | $\alpha^6$ | $\alpha^1$ | $\alpha^5$ | $\alpha^4$ | $\alpha^2$ |
| $\alpha^1$ | $\alpha^1$ | $\alpha^3$ | 0 | $\alpha^4$ | $\alpha^0$ | $\alpha^2$ | $\alpha^6$ | $\alpha^5$ |
| $\alpha^2$ | $\alpha^2$ | $\alpha^6$ | $\alpha^4$ | 0 | $\alpha^5$ | $\alpha^1$ | $\alpha^3$ | $\alpha^0$ |
| $\alpha^3$ | $\alpha^3$ | $\alpha^1$ | $\alpha^0$ | $\alpha^5$ | 0 | $\alpha^6$ | $\alpha^2$ | $\alpha^4$ |
| $\alpha^4$ | $\alpha^4$ | $\alpha^5$ | $\alpha^2$ | $\alpha^1$ | $\alpha^6$ | 0 | $\alpha^0$ | $\alpha^3$ |
| $\alpha^5$ | $\alpha^5$ | $\alpha^4$ | $\alpha^6$ | $\alpha^3$ | $\alpha^2$ | $\alpha^0$ | 0 | $\alpha^1$ |
| $\alpha^6$ | $\alpha^6$ | $\alpha^2$ | $\alpha^5$ | $\alpha^0$ | $\alpha^4$ | $\alpha^3$ | $\alpha^1$ | 0 |

The multiplier of $X^3$, with factor $\alpha^3$ can be combined with the GF(8) adder as function sc3. The truth table of sc3 is shown in truth table sc3$t$.

| sc3t | 0 | $\alpha^0$ | $\alpha^1$ | $\alpha^2$ | $\alpha^3$ | $\alpha^4$ | $\alpha^5$ | $\alpha^6$ |
|---|---|---|---|---|---|---|---|---|
| 0 | 0 | $\alpha^3$ | $\alpha^4$ | $\alpha^5$ | $\alpha^6$ | $\alpha^0$ | $\alpha^1$ | $\alpha^2$ |
| $\alpha^0$ | $\alpha^0$ | $\alpha^1$ | $\alpha^5$ | $\alpha^4$ | $\alpha^2$ | 0 | $\alpha^3$ | $\alpha^6$ |
| $\alpha^1$ | $\alpha^1$ | $\alpha^0$ | $\alpha^2$ | $\alpha^6$ | $\alpha^5$ | $\alpha^3$ | 0 | $\alpha^4$ |
| $\alpha^2$ | $\alpha^2$ | $\alpha^5$ | $\alpha^1$ | $\alpha^3$ | $\alpha^0$ | $\alpha^6$ | $\alpha^4$ | 0 |
| $\alpha^3$ | $\alpha^3$ | 0 | $\alpha^6$ | $\alpha^2$ | $\alpha^4$ | $\alpha^1$ | $\alpha^0$ | $\alpha^5$ |
| $\alpha^4$ | $\alpha^4$ | $\alpha^6$ | 0 | $\alpha^0$ | $\alpha^3$ | $\alpha^5$ | $\alpha^2$ | $\alpha^1$ |
| $\alpha^5$ | $\alpha^5$ | $\alpha^2$ | $\alpha^0$ | 0 | $\alpha^1$ | $\alpha^4$ | $\alpha^6$ | $\alpha^3$ |
| $\alpha^6$ | $\alpha^6$ | $\alpha^4$ | $\alpha^3$ | $\alpha^1$ | 0 | $\alpha^2$ | $\alpha^5$ | $\alpha^0$ |

The polynomial expression for the "Sklar" RS coder can now be provided as: $g(x)=\alpha^3$ sc1 $X^2$ sc2 X sc3 $X^3+X^4$. This is a novel way of describing an RS coder.

One can check the example by using the same input signals as used by "Sklar" in his article. "Sklar" applies a reverse notation; the last element in a row enters the circuit first. Accordingly the first number to enter is $\alpha^5$, followed by $\alpha^3$ and then by $\alpha^1$. In the example all numbers are represented by 3 bits. In the present invention no translation from 8-valued (or n-valued) to binary is required, but is allowed. The present invention works on any n-valued logic. For practical purposes one may want to execute the n-valued functions in binary form, for instance by using means such as look-up tables.

One can show that the function reduction in the illustrative example derived from the "Sklar" example will generate the correct result.

| | | sr1 | | sr2 | | sr3 | | sr4 | |
|---|---|---|---|---|---|---|---|---|---|
| Input | clock | in | out | in | out | in | out | in | out | Feedback |
| $\alpha^5$ | 0 | $\alpha^1$ | 0 | $\alpha^6$ | 0 | $\alpha^5$ | 0 | $\alpha^1$ | 0 | $\alpha^5$ |
| $\alpha^3$ | 1 | $\alpha^3$ | $\alpha^1$ | 0 | $\alpha^6$ | $\alpha^2$ | $\alpha^5$ | $\alpha^2$ | $\alpha^1$ | $\alpha^0$ |
| $\alpha^1$ | 2 | $\alpha^0$ | $\alpha^3$ | $\alpha^2$ | 0 | $\alpha^4$ | $\alpha^2$ | $\alpha^6$ | $\alpha^2$ | $\alpha^4$ |
| — | 3 | | $\alpha^0$ | | $\alpha^2$ | | $\alpha^4$ | | $\alpha^6$ | 0 |

The Feedback is created by using the addition of the output of shift register element sr4 and the input symbol. The Feedback is the actual input to the inverter Inv and to functions sc1, sc2, and sc3 in FIG. 6. The shift register elements have input values and output values. After a clock pulse the output value assumes the value of the previous input. At the start of the process the content of the shift register elements is 0. The example shows that the reduction process works. One can easily check the method by substituting $\alpha^0=1$, $\alpha^1=2$, $\alpha^2=3$, $\alpha^3=4$, $\alpha^4=5$, $\alpha^5=6$ and $\alpha^6=7$. Accordingly it has been shown that this method as one aspect of the present invention to reduce the function count in n-valued LFSRs in Galois configuration (such as used in RS-coders) works well. The terms 'adder' and 'multiplier' are used here. It should be apparent that any n-valued expression: (aa sc1 p) sc2 (bb sc3 q) can be reduced to: (aa sc4 bb); wherein aa and bb are n-valued variables, p and q are n-valued constants and sc1, sc2, sc3 and sc4 are n-valued switching functions.

While one can significantly reduce the number of components it is not directly possible to prevent inclusion of a multiplier g0 in a Galois configuration. Accordingly if g0 can not be represented by an identify inverter, one multiplier will remain in a reduced n-valued LFSR in Galois configuration.

For the purpose of the present disclosure the new LFSR configuration is called and defined as being: a multiplier reduced n-valued LFSR. In the present case as shown in FIG. 5 the multiplier reduced n-valued LFSR is in Galois configuration. Such a multiplier reduced multi-valued LFSR can be recognized as having at least one n-valued 2 input/single output logic function not being a 2 input/single output addition function in GF(n). In a maximally reduced n-valued multiplier reduced n-valued LFSR in Galois configuration one may still have one multiplier g0.

The n-Valued LFSR in Fibonacci Configuration

The diagrams as shown in FIGS. 3, 4 and 5 implement polynomials in Galois configurations. One can also realize these encoders in so called Fibonacci configuration.

$$H(X)=X^k+h_{k-1}X^{k-1}+h_{k-2}X^{k-2}+\ldots+h_1X^1+h_0$$

Figure 6:
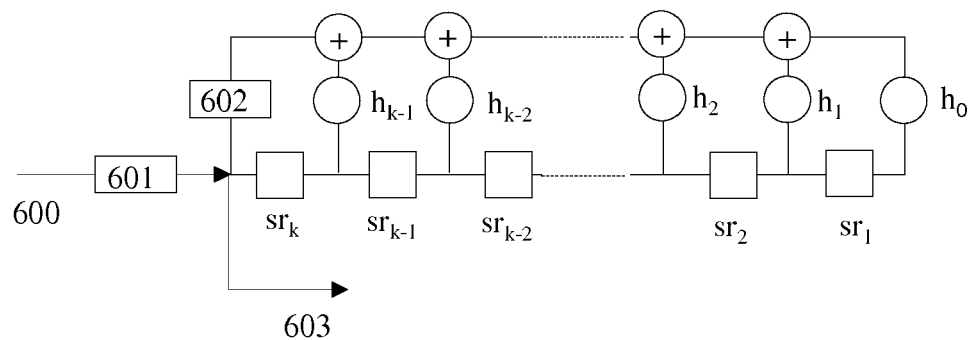
FIG. 6 is another diagram of a Reed Solomon coder and is known art.

The terms $h_k$ in the polynomial H(X) is 1. The polynomial expresses again a n-valued Reed Solomon encoder. The encoder for this polynomial in Fibonacci configuration is shown in FIG. 6. This drawing is taken from the earlier cited "Lin-Costello" page 148 FIG. 5.3. A message of multi-valued symbols is provided at input 600. A gate 601 is conducting and a second gate 602 is non-conducting to pass the message symbols to the output 603 and to fill the initial state of the shift register. After all message symbols of a codeword are shifted into the shift register gate 601 becomes non-conducting and gate 602 becomes conducting, thus enabling check symbols to be provided on output 603. The LFSR are shown in FIG. 6 has n-valued multipliers $h_0$ to $h_{k-1}$ and n-valued adders+in GF(n). For the purpose of an RS encoder the multipliers are usually determined by the coefficients of a primitive polynomial in GF(n).

Figure 7:
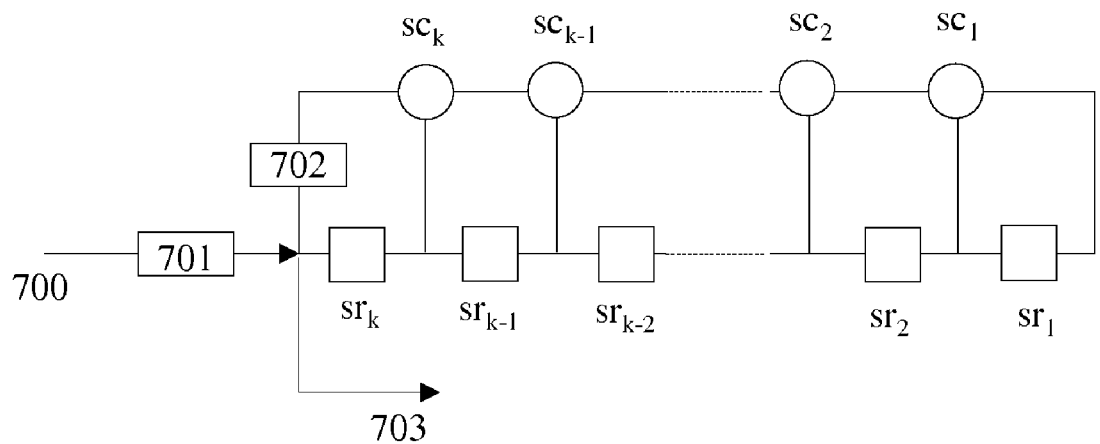
FIG. 7 is a diagram of a Reed Solomon coder in accordance with an aspect of the present invention.

In accordance with a further aspect of the present invention the multi-valued LFSR of FIG. 6 can be reduced to the multi-valued LFSR of FIG. 7. Gates 701 and 702 are identical to gates 601 and 602 in FIG. 6. Input 700 and output 703 provide the same symbols as in FIG. 6. In FIG. 7 no multipliers are present. In accordance with the earlier reduction rule the adders over GF(n) are replaced by the n-valued 2 input single output logic functions: $sc_k, sc_{k-1}, \ldots, sc_2, sc_1$. In contrast with the multiplier reduced Galois configuration the multiplier reduced Fibonacci configuration as shown here can be reduced to having no multipliers $h_0, h_1, \ldots, h_{k-1}$.

Syndrome Computation

An important part of the error correcting activity is known as "syndrome computation". In an RS-code one may receive a code word of n symbols. Encoding of the original word comprises the steps of calculating by way using a n-valued LFSR the remainder of the message after a GF(n) division and attaching the remainder to the message to complete the code word.

Assume the received vector to be represented as polynomial:

$$r(X) = r_0 + r_1 X + r_2 X^2 + \ldots + r_{n-1} X^{n-1}.$$

Dividing r(X) by the polynomial g(X) that was used to generate r(X) will create: $r(X)=a(X)g(X)+s(X)$. The coefficients of s(X) form the syndrome s. This is known in the theory of error-correcting coding and taken from the earlier recited book Lin-Costello on error Control Coding. The circuit as shown in FIG. 8 is an (n-k)-stage syndrome circuit.

Figure 8:
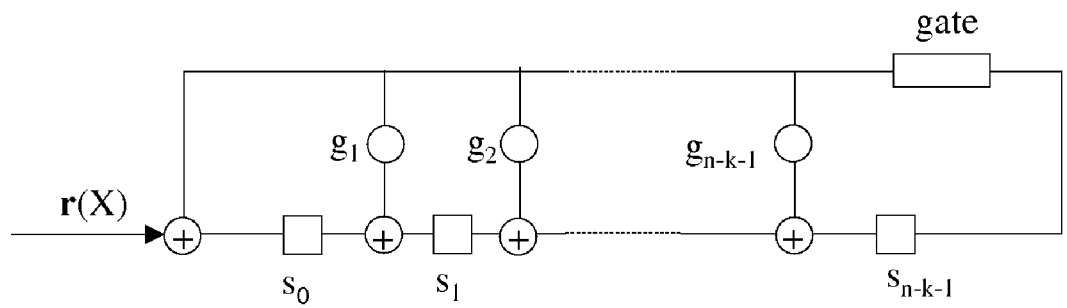
FIG. 8 is a diagram with an n-valued LFSR and is known art.
Figure 9:
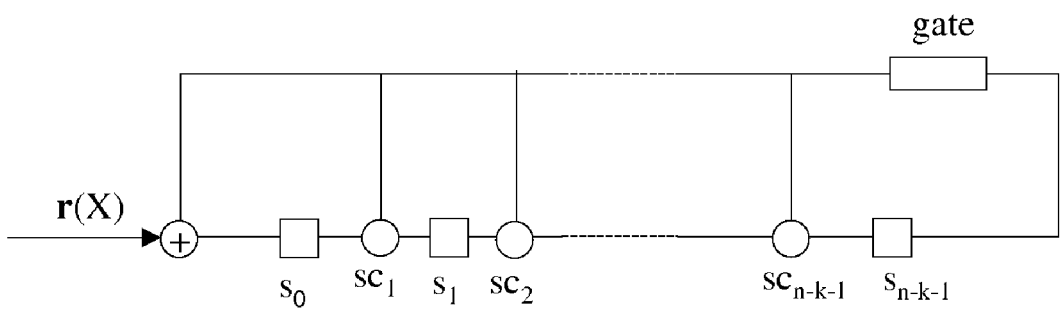
FIG. 9 is a diagram with an n-valued LFSR in accordance with an aspect of the present invention.

FIG. 8. also appears as FIG. 5.5 on page 150 of "Lin-Costello". It is another aspect of the present invention to apply the function reduction method to an n-valued syndrome calculating circuit so that a syndrome circuit comprised of an LFSR with adders of which an input signal is multiplied by a factor $g_i$ can be replaced by an LFSR circuit wherein no or a limited number of multipliers are applied as shown in FIG. 9. In FIG. 1 all adder functions with a multiplier at an input can be replaced by a single n-valued logic function with no multiplier at an input. Accordingly the circuit of FIG. 9 provides the same results as the circuit in FIG. 9 but has fewer components and may need fewer clock cycles to create the result.

The above syndrome approach of FIGS. 8 and 9 have its input from the left. Another type of syndrome circuit is provided with an input on the right. A diagram of such a circuit is shown in FIG. 10 and is taken from the earlier recited book Error Control Coding "Lin-Costello" as FIG. 5.7 on page 153.

Figure 10:
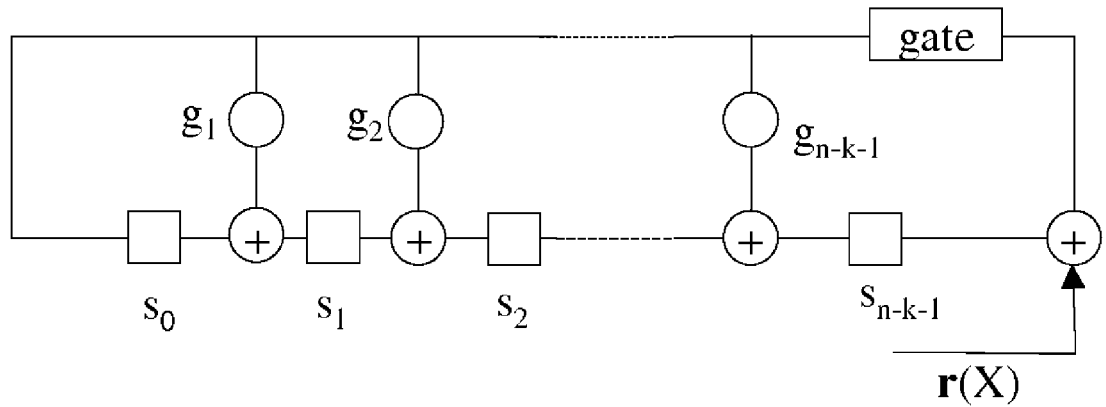
FIG. 10 is another diagram with an n-valued LFSR and is known art.
Figure 11:
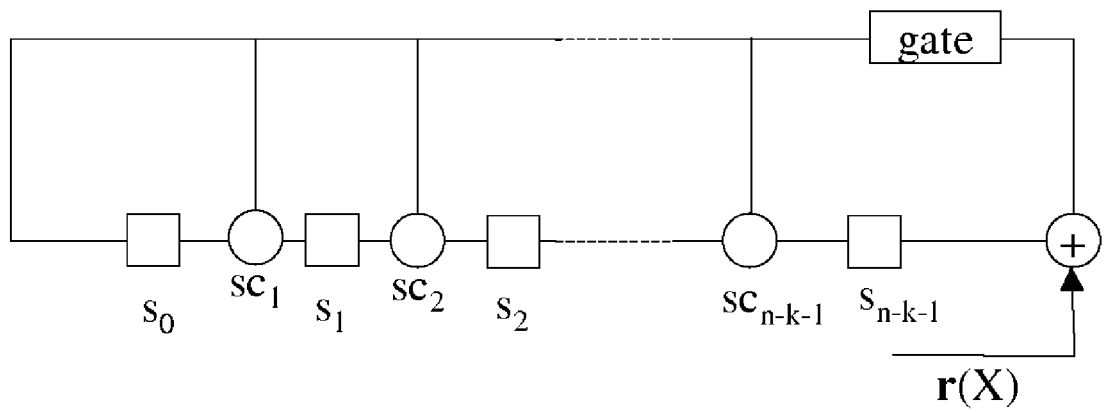
FIG. 11 is another diagram with an n-valued LFSR in accordance with an aspect of the present invention.

It is another aspect of the present invention to apply the function reduction method to this type of syndrome circuit as shown in FIG. 10 and replace the circuit of the n-valued LFSR with adders of which one input is multiplied by a factor $g_i$ by an n-valued LFSR in which no or fewer multipliers than in FIG. 10 are used. The solution according to this aspect of the invention is shown in FIG. 11. It is shown that most of the n-valued adders are replaced by $sc_1, sc_2, \ldots, sc_{n-k-1}$. The adder at the signal input remains.

It is known that the syndrome polynomial of an RS-code is $$S(X) = S_1 + S_2 X + S_3 X^2 + \ldots + S_{2t} X^{2t-1} \text{ with}$$

$$S_i = R(\alpha^i) \text{ and}$$

$$R(X) = R_0 + R_1 X + \ldots + R_{N-1} X^{N-1}$$

Figure 12:
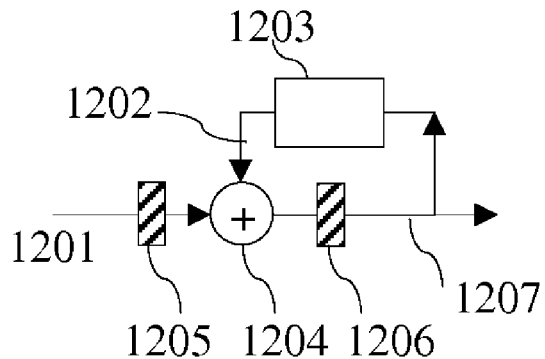
FIG. 12 is a diagram of a syndrome calculating device and is known art.

This syndrome calculation and related diagram is from Hsie-Chia Chang, Ching-Che Chung, Chien-ChingLin, and Chen-Yi Lee, "A High Speed Reed-Solomon decoder chip using inversionless decomposed architecture for Euclidean algorithm", 2002 European Solid-State Circuits Conference, and is shown in FIG. 12.

The diagram in FIG. 12 is essentially an adder 1204 with two inputs, 1201 and 1202, and an output 1207. The signal on the output is fed back to a multiplier 1203. The output of the multiplier is an input to the adder. Two gates, 1205 and 1206, make sure the correct operations are executed.

Figure 13:
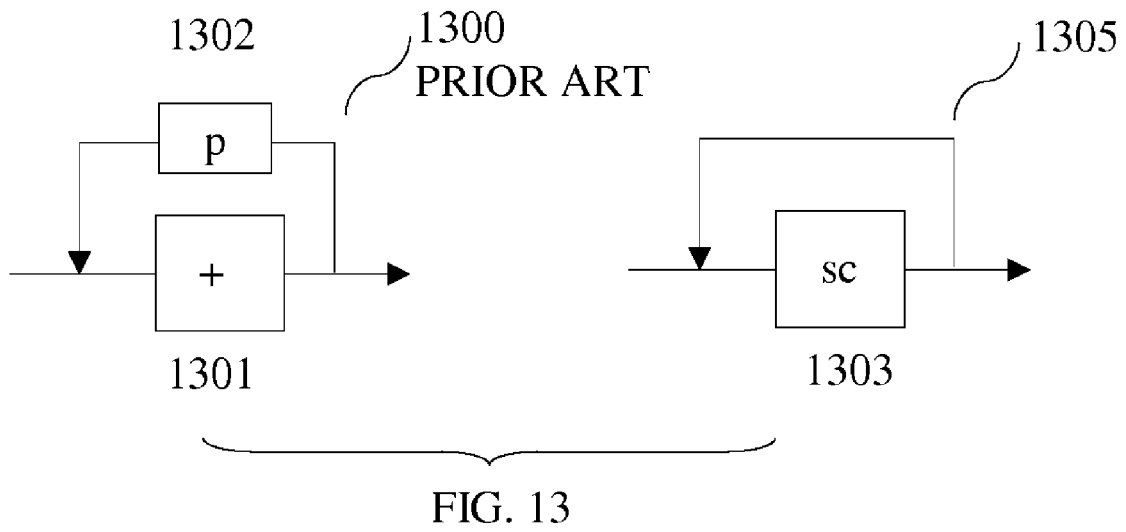
FIG. 13 is a diagram illustrating a feedback device as known art and the same device in accordance with an aspect of the present invention.

FIG. 13 shows the adder with feedback multiplication in 1300 as it is known with an n-valued adder 1301 and multiplier 1302. Usually RS codes are developed in an extended binary field so all circuits may be realized as binary circuits. Diagram 1305 shows the equivalent of 1300 in accordance with an aspect of the present invention. It has an n-valued function 1303 and no feedback multiplier.

Assume that the adder function executes the following truth table in GF(8):

| add | 0 | $\alpha^0$ | $\alpha^1$ | $\alpha^2$ | $\alpha^3$ | $\alpha^4$ | $\alpha^5$ | $\alpha^6$ |
|---|---|---|---|---|---|---|---|---|
| 0 | 0 | $\alpha^0$ | $\alpha^1$ | $\alpha^2$ | $\alpha^3$ | $\alpha^4$ | $\alpha^5$ | $\alpha^6$ |
| $\alpha^0$ | $\alpha^0$ | 0 | $\alpha^3$ | $\alpha^6$ | $\alpha^1$ | $\alpha^5$ | $\alpha^4$ | $\alpha^2$ |
| $\alpha^1$ | $\alpha^1$ | $\alpha^3$ | 0 | $\alpha^4$ | $\alpha^0$ | $\alpha^2$ | $\alpha^6$ | $\alpha^5$ |
| $\alpha^2$ | $\alpha^2$ | $\alpha^6$ | $\alpha^4$ | 0 | $\alpha^5$ | $\alpha^1$ | $\alpha^3$ | $\alpha^0$ |
| $\alpha^3$ | $\alpha^3$ | $\alpha^1$ | $\alpha^0$ | $\alpha^5$ | 0 | $\alpha^6$ | $\alpha^2$ | $\alpha^4$ |
| $\alpha^4$ | $\alpha^4$ | $\alpha^5$ | $\alpha^2$ | $\alpha^1$ | $\alpha^6$ | 0 | $\alpha^0$ | $\alpha^3$ |
| $\alpha^5$ | $\alpha^5$ | $\alpha^4$ | $\alpha^6$ | $\alpha^3$ | $\alpha^2$ | $\alpha^0$ | 0 | $\alpha^1$ |
| $\alpha^6$ | $\alpha^6$ | $\alpha^2$ | $\alpha^5$ | $\alpha^0$ | $\alpha^4$ | $\alpha^3$ | $\alpha^1$ | 0 |

Assume that the multiplication is by a factor $p=\alpha^4$ according to the following multiplication table in GF(8):

| mult | 0 | $\alpha^0$ | $\alpha^1$ | $\alpha^2$ | $\alpha^3$ | $\alpha^4$ | $\alpha^5$ | $\alpha^6$ |
|---|---|---|---|---|---|---|---|---|
| 0 | 0 | 0 | 0 | 0 | 0 | 0 | 0 | 0 |
| $\alpha^0$ | 0 | $\alpha^0$ | $\alpha^1$ | $\alpha^2$ | $\alpha^3$ | $\alpha^4$ | $\alpha^5$ | $\alpha^6$ |
| $\alpha^1$ | 0 | $\alpha^1$ | $\alpha^2$ | $\alpha^3$ | $\alpha^4$ | $\alpha^5$ | $\alpha^6$ | $\alpha^0$ |
| $\alpha^2$ | 0 | $\alpha^2$ | $\alpha^3$ | $\alpha^4$ | $\alpha^5$ | $\alpha^6$ | $\alpha^0$ | $\alpha^1$ |
| $\alpha^3$ | 0 | $\alpha^3$ | $\alpha^4$ | $\alpha^5$ | $\alpha^6$ | $\alpha^0$ | $\alpha^1$ | $\alpha^2$ |
| $\alpha^4$ | 0 | $\alpha^4$ | $\alpha^5$ | $\alpha^6$ | $\alpha^0$ | $\alpha^1$ | $\alpha^2$ | $\alpha^3$ |
| $\alpha^5$ | 0 | $\alpha^5$ | $\alpha^6$ | $\alpha^0$ | $\alpha^1$ | $\alpha^2$ | $\alpha^3$ | $\alpha^4$ |
| $\alpha^6$ | 0 | $\alpha^6$ | $\alpha^0$ | $\alpha^1$ | $\alpha^2$ | $\alpha^3$ | $\alpha^4$ | $\alpha^5$ |

This multiplication with a constant can then be represented by the inverter $[0\ \alpha^4\ \alpha^5\ \alpha^6\ \alpha^0\ \alpha^1\ \alpha^2\ \alpha^3]$. The function sc in 1303 in FIG. 13 then executes the truth table:

| add | 0 | $\alpha^0$ | $\alpha^1$ | $\alpha^2$ | $\alpha^3$ | $\alpha^4$ | $\alpha^5$ | $\alpha^6$ |
|---|---|---|---|---|---|---|---|---|
| 0 | 0 | $\alpha^4$ | $\alpha^5$ | $\alpha^6$ | $\alpha^0$ | $\alpha^1$ | $\alpha^2$ | $\alpha^3$ |
| $\alpha^0$ | $\alpha^0$ | $\alpha^5$ | $\alpha^4$ | $\alpha^2$ | 0 | $\alpha^3$ | $\alpha^6$ | $\alpha^1$ |
| $\alpha^1$ | $\alpha^1$ | $\alpha^2$ | $\alpha^6$ | $\alpha^5$ | $\alpha^3$ | 0 | $\alpha^4$ | $\alpha^0$ |
| $\alpha^2$ | $\alpha^2$ | $\alpha^1$ | $\alpha^3$ | $\alpha^0$ | $\alpha^6$ | $\alpha^4$ | 0 | $\alpha^5$ |
| $\alpha^3$ | $\alpha^3$ | $\alpha^6$ | $\alpha^2$ | $\alpha^4$ | $\alpha^1$ | $\alpha^0$ | $\alpha^5$ | 0 |
| $\alpha^4$ | $\alpha^4$ | 0 | $\alpha^0$ | $\alpha^3$ | $\alpha^5$ | $\alpha^2$ | $\alpha^1$ | $\alpha^6$ |
| $\alpha^5$ | $\alpha^5$ | $\alpha^0$ | 0 | $\alpha^1$ | $\alpha^4$ | $\alpha^6$ | $\alpha^3$ | $\alpha^2$ |
| $\alpha^6$ | $\alpha^6$ | $\alpha^3$ | $\alpha^1$ | 0 | $\alpha^2$ | $\alpha^5$ | $\alpha^0$ | $\alpha^4$ |

Composite n-Valued LFSRs

Another interesting circuit to which the 'reduction of functions' method can be applied to is a circuit that executes an n-valued multiplication and division at the same time. An example of such a circuit is provided in FIG. 14.

The polynomial $\epsilon(X)=\epsilon_0+\epsilon_1 X+\epsilon_2 X^2+ \ldots +\epsilon_{n-k-1} X^{n-k-1}$.

The polynomial $g(X)=1+g_1 X+g_2 X^2+ \ldots +X^{n-k}$.

Figure 14:
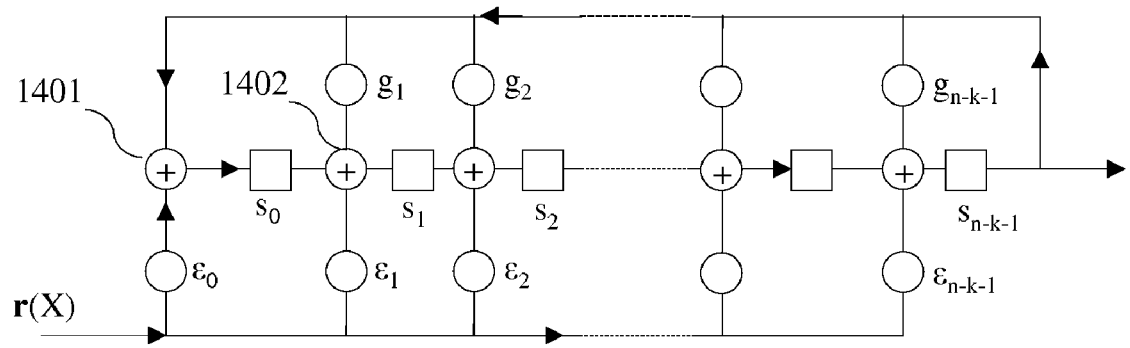
FIG. 14 is a diagram illustrating a polynomial calculation and is known art.

The circuit of FIG. 14 will compute $\epsilon(X)*r(X)/g(X)$. The circuit of FIG. 14 is known and can be found for instance in the earlier cited "Lin-Costello" book Error Control Coding as FIG. 5.19 on page 180.

Figure 15:
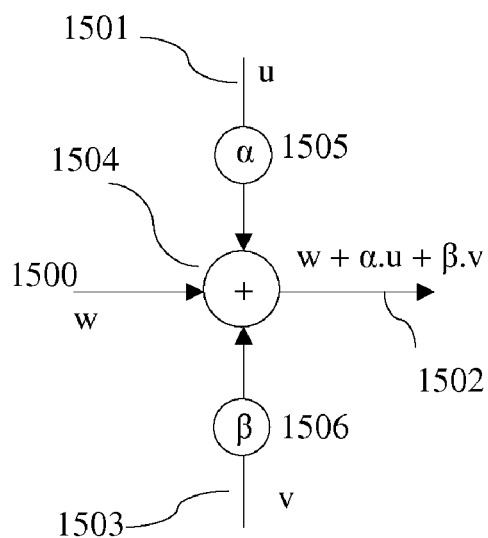
FIG. 15 is a detailed diagram of a part of the diagram of FIG. 14.

FIG. 14 shows most of the adders as three inputs circuits. This is of course allowed as $(a+\alpha.b)+\beta.c=a+(\alpha.b+\beta.c)$ and it does not matter how the addition is executed. Specifically two adders 1401 and 1402 are identified. In practice basic arithmetical circuits are in general two input/single output circuits. FIG. 15 is a diagram of a circuit that executes $w+\alpha.u+\beta.v$ wherein $\alpha$ and $\beta$ are constant factors. The three input signals u, v and w are provided on three inputs 1500, 1501 and 1503. The result is generated on output 1502. The solution includes two n-valued multipliers 1505 and 1506 and the n-valued adder 504. In a practical sense the expression here considered in many cases will be executed in two steps as for instance shown in FIG. 16. Herein first for instance the two signals u and v will be inputted on 1601 and 1602 and each one will be n-valued multiplied and then summed in an adder. An intermediate result will be generated on an output 1603, which is also a first input to a next adder. The next adder also has a second input 1604 which will provide the signal representing w. The end result will be generated on an output 1605.

Figure 16:
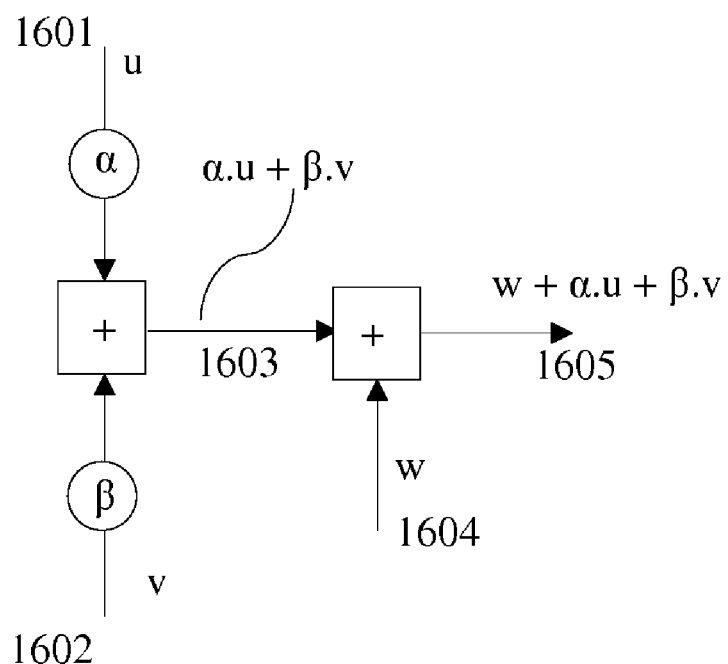
FIG. 16 is a diagram of a modified part of the diagram of FIG. 14.
Figure 17:
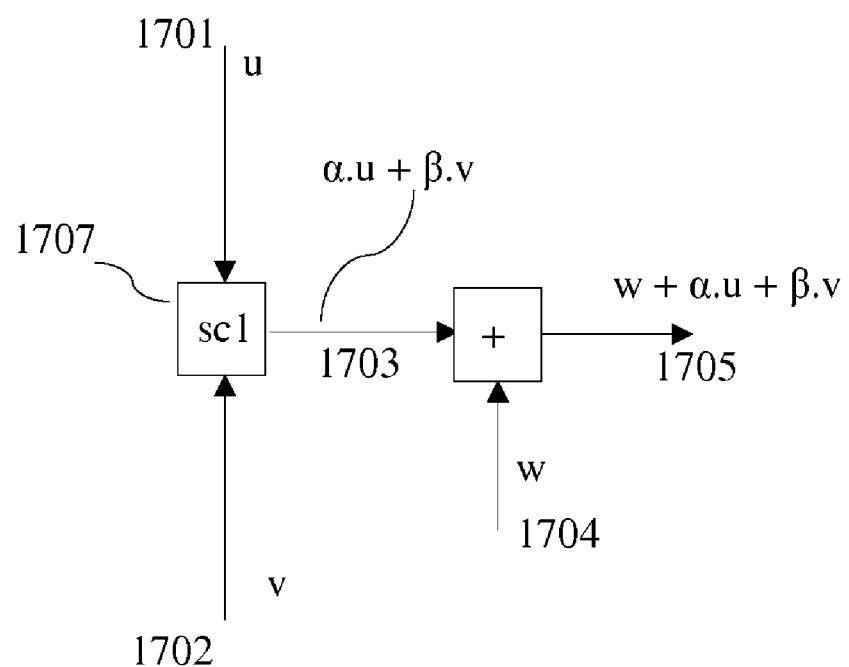
FIG. 17 is a diagram of a modified part of the diagram of FIG. 14 in accordance with an aspect of the present invention.

In accordance with the multiplier reduction method one can reduce the circuit of FIG. 16 to the circuit of FIG. 17. In the circuit of FIG. 17 signals u and v are provided on inputs 1701 and 1702 to a device 1707 executing an n-valued function sc1. No multipliers are included in the inputs. The intermediate result is generated on output 1703 which is also an input to an n-valued adder. A signal w is provided on a second input 1704 to the adder and the end result is generated on output 1705. It should be clear that due to the associative nature of addition one can create different configurations that will have no multipliers with identical results.

Figure 18:
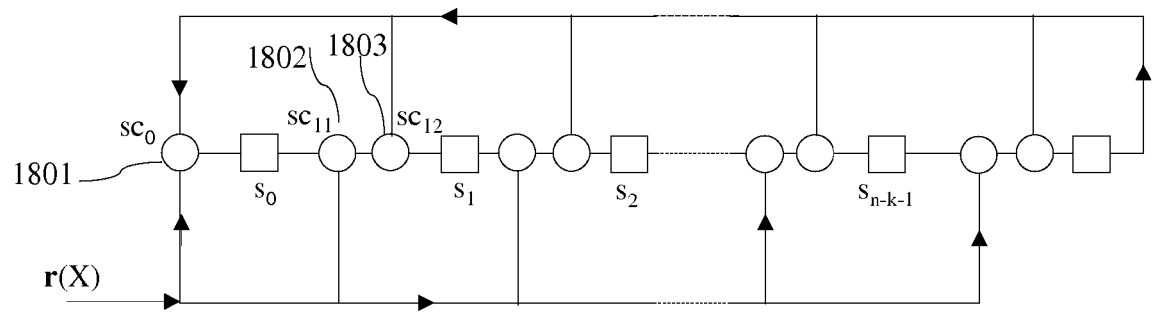
FIG. 18 is a diagram illustrating a polynomial calculation in accordance with an aspect of the present invention.

The circuit of FIG. 14 can now be replaced by the circuit of FIG. 18. In FIG. 18 function sc0 implemented in device 1801 replaces adder 1401 with its multiplier in FIG. 14. Furthermore functions $sc_{11}$ and $sc_{12}$ implemented in devices 1802 and 1803 replace adder 1402 with its multipliers in FIG. 14. There is some saving in components in FIG. 18 compared to FIG. 14. However it would be more advantageous in clock cycles if one could indeed create a k-input n-valued logic function replacing a single n-valued function such as an adder with n-valued inverters or multipliers at its inputs.

As another aspect of the present invention n-valued multiplier (or inverter) reduction method will here be provided for a k-valued input function to a n-valued logic function. It is understood that the term n-valued multiplier, which is a n-valued multiplier by a constant in GF(n), is identical to a n-valued inverter. Terms such as multipliers and adders in GF(n) provide an interpretation to what essentially are switching functions. These n-valued functions can assume one of n states. These states have physical representations, such as a voltage, a frequency, an intensity level, a polarization direction, a phase angle in a signal, or whatever phenomenon is used. These physical signals in actuality likely will not have a value that is identical to the value that is assigned to a state. In that sense terms like value and state and inverter and multiplier may be considered equivalent.

For the purpose of the present disclosure n-valued logic or switching functions are assumed to be identical to their equivalent GF(n) arithmetical functions and have the same truth tables unless it is specifically identified as not being the case.

The examples for k input n-valued functions will be based on GF(n) arithmetical expressions. This is to limit potential confusion in order of inputs. However it should be appreciated that the method that will be provided next can be applied to any type of n-valued functions with n-valued inverters, no matter if these functions have a GF(n) equivalent.

Figure 19:
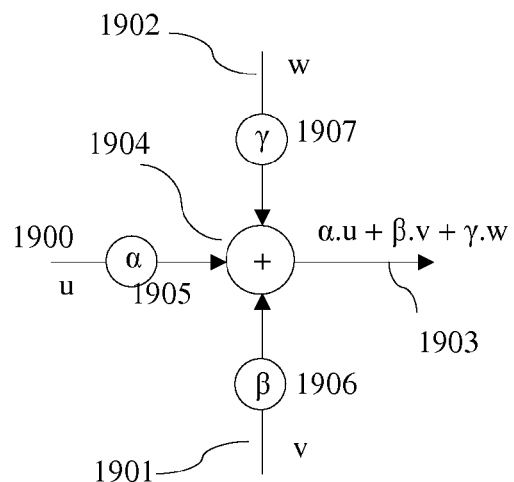
FIG. 19 is a diagram of a multi-input logic device.
Figure 20:
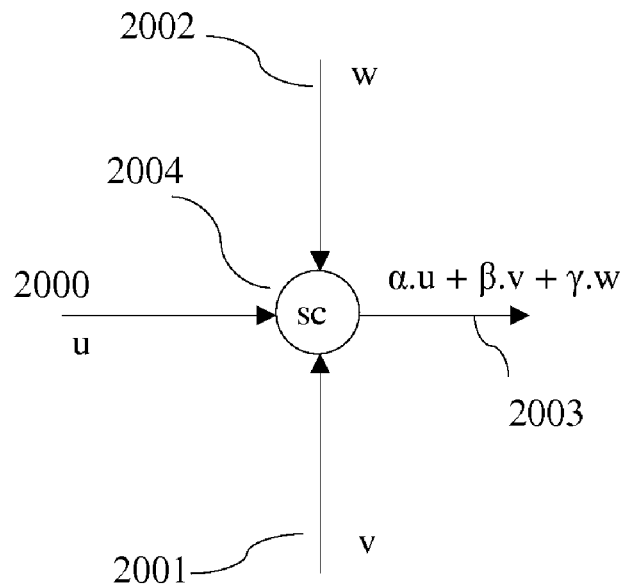
FIG. 20 is a diagram of an inverter reduced multi-input logic device.

In mathematical terms the k input reduction problem is illustrated in FIGS. 19 and 20. FIG. 19 shows an adder with three inputs 1900, 1901 and 1902 providing u, v and w, each of the inputs having a multiplier (1905, 1906 and 1907 as $\alpha$, $\beta$, and $\gamma$). A result $\alpha.u+\beta.v+\gamma.w$ is provided on output 1903. A multiplier reduced solution is shown in FIG. 20 with inputs 2000, 2001 and 2002 providing u, v and w into a n-valued function 2004 and providing the correct solution on output 2003.

Figure 21:
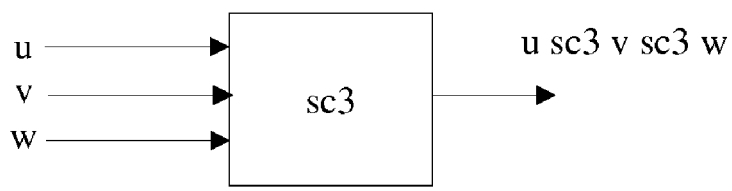
FIG. 21 is another diagram of a multi-input logic device.

It is understood that this mathematical reduction in GF(n) is a special case for an n-valued case with an n-valued function with k inputs and potentially an inverter at each input. The diagram of FIG. 21 shows an n-valued switching device implementing a n-valued function sc3 with 3 inputs and executing: u sc3 v sc3 w. In the example sc3 being + in GF(n) makes sc3 associative and commutative. In that case order of inputs and order of execution does not matter. However it should be appreciated that in a non-commutative and non associative case {(u sc3 v) sc3 w}≠{(v sc3 u) sc3 w} and {(u sc3 v) sc3 w}≠{u sc3 (v sc3 w)}. In that case one should carefully watch the use of truth tables and order of execution to calculate reduced truth tables. However the same methods will apply. It just means one should take care where to provide a certain input.

Figure 22:
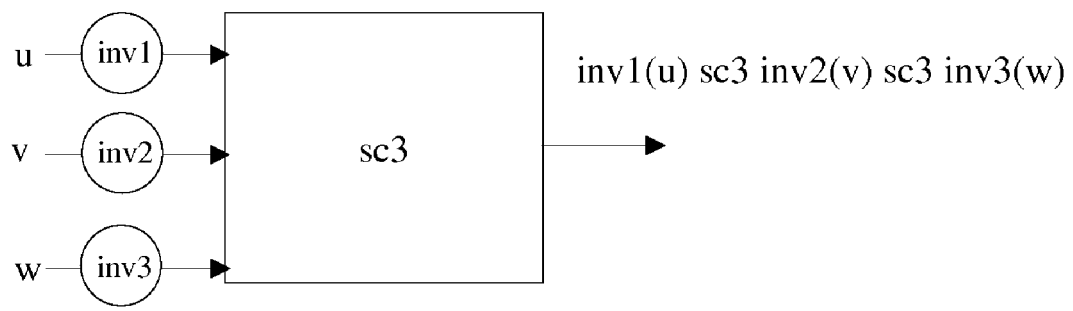
FIG. 22 is a diagram of a multi-input logic device with inverters.

FIG. 22 shows a device implementing a 3 input n-valued switching function wherein each input has an inverter. The device executes: inv1(*u*) sc3 inv2(*v*) sc3 inv3(*w*) assuming that the function sc3 is associative.

Figure 23:
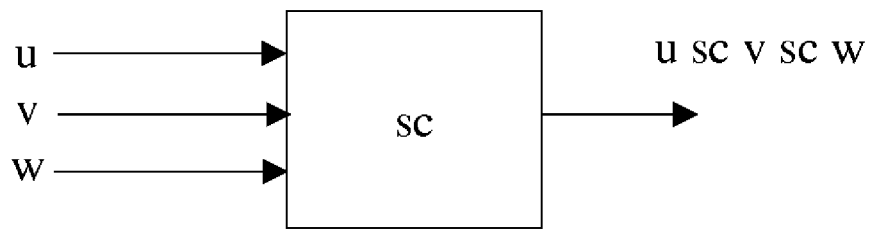
FIG. 23 is another diagram of an inverter reduced multi-input logic device.

The purpose of the inverter or multiplier reducing method is to find a n-valued function with truth table sc that also executes inv1(*u*) sc3 inv2(*v*) sc3 inv3(*w*) as shown in FIG. 23 that has no inverters or multipliers.

It should be noted that a truth table of an n-valued function with 3 inputs is different from a function with 2 inputs. In fact one may consider the truth table of a 2 inputs function to be a subset of a k-inputs truth table. For every additional input an additional dimension is added to the original (k−1) dimensional truth table.

As a first example of this aspect of the present invention the function sc3 of FIG. 21 is assumed to be a 4-valued adder over GF(4). The truth table of sc3 is graphically illustrated in FIG. 24 as a layer of 3 sub truth tables 2401, 2402, 2403 and 2404. The input u determines a row in the truth table, input v the column and input w the plane. All variables are 4-valued and can assume of 3 states. The following table shows the truth table of sc3.

| sc3 w=0 | | v 0 | 1 | 2 | 3 | w=1 | v 0 | 1 | 2 | 3 | w=2 | v 0 | 1 | 2 | 3 | w=3 | v 0 | 1 | 2 | 3 |
|---|---|---|---|---|---|---|---|---|---|---|---|---|---|---|---|---|---|---|---|---|
| | 0 | 0 | 1 | 2 | 3 | | 1 | 0 | 3 | 2 | | 2 | 3 | 0 | 1 | | 3 | 2 | 1 | 0 |
| u | 1 | 1 | 0 | 3 | 2 | | 0 | 1 | 2 | 3 | | 3 | 2 | 1 | 0 | | 2 | 3 | 0 | 1 |
| | 2 | 2 | 3 | 0 | 1 | | 3 | 2 | 1 | 0 | | 0 | 1 | 2 | 3 | | 1 | 0 | 3 | 2 |
| | 3 | 3 | 2 | 1 | 0 | | 2 | 3 | 0 | 1 | | 1 | 0 | 3 | 2 | | 0 | 1 | 2 | 3 |

Figure 24:
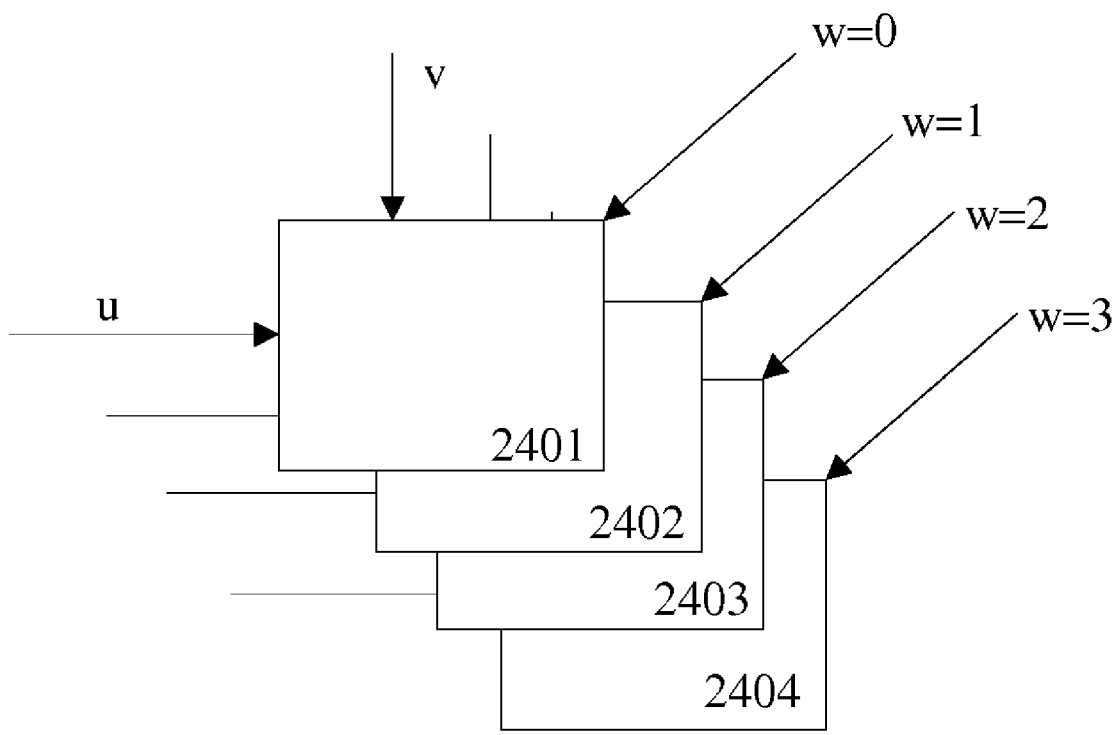
FIG. 24 is an illustration of a truth table of a multi-input logic device.
Figure 25:
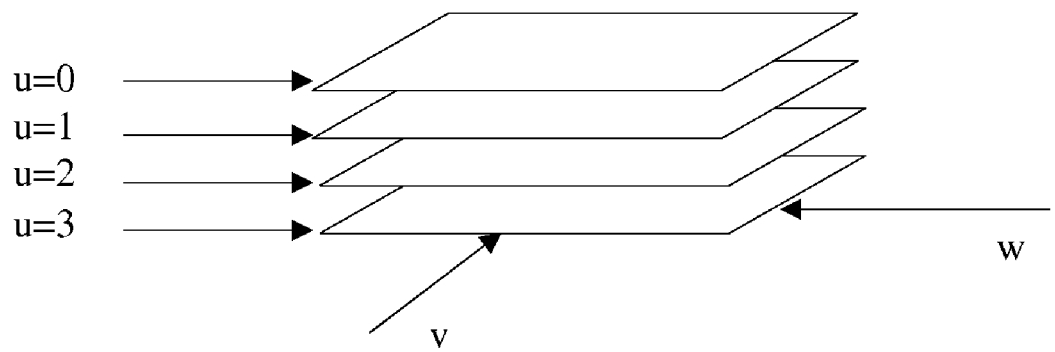
FIG. 25 is another illustration of a truth table of a multi-input logic device.

In fact the truth table of sc3 is a 3 dimensional matrix sc3(i,j,k). The above table shows the truth table with input w determining the planes as shown in FIG. 24. However one could also display the truth table with for instance u determining the planes, as shown in FIG. 25. One can easily check that the individual two dimensional tables of the truth table are the same as in the first truth table.

As a next aspect of the present invention each of the inputs of the 3-inputs 4-valued adder will get an inverter or a multiplier as shown in FIG. 22. It does not matter what the order of execution is in this example as the 4-valued function in this example is commutative and associative. Of course there where such is not the case, one should take care of order of inputs and of execution. However it is always important to maintain the relation between input and inverter. As an example assume that a multiplier in GF(4) will be used with the following truth table.

| m4 | 0 | 1 | 2 | 3 |
|---|---|---|---|---|
| 0 | 0 | 0 | 0 | 0 |
| 1 | 0 | 1 | 2 | 3 |
| 2 | 0 | 2 | 3 | 1 |
| 3 | 0 | 3 | 1 | 2 |

Assume that u will be multiplied with 1 (or has the unity inverter [0 1 2 3]), v with 2 (or will have the inverter [0 2 3 1]) and w with 3 (or will have the inverter [0 3 1 2]). The multipliers will be eliminated from the truth table by modifying each dimension of the truth table in accordance with its inverter. The resulting truth table from FIG. 22 into FIG. 23 has now a function sc with no multipliers. It truth table is shown in the following table.

| sc w=0 | | v 0 | 1 | 2 | 3 | w=1 | v 0 | 1 | 2 | 3 | w=2 | v 0 | 1 | 2 | 3 | w=3 | v 0 | 1 | 2 | 3 |
|---|---|---|---|---|---|---|---|---|---|---|---|---|---|---|---|---|---|---|---|---|
| | 0 | 0 | 2 | 3 | 1 | | 3 | 1 | 0 | 2 | | 1 | 3 | 2 | 0 | | 2 | 0 | 1 | 3 |
| u | 1 | 1 | 3 | 2 | 0 | | 2 | 0 | 1 | 3 | | 0 | 2 | 3 | 1 | | 3 | 1 | 0 | 2 |
| | 2 | 2 | 0 | 1 | 3 | | 1 | 3 | 2 | 0 | | 3 | 1 | 0 | 2 | | 0 | 2 | 3 | 1 |
| | 3 | 3 | 1 | 0 | 2 | | 0 | 2 | 3 | 1 | | 2 | 0 | 1 | 3 | | 1 | 3 | 2 | 0 |

One may check the correctness of the truth table by executing z=u+2v+3v for instance (u,v,w)=(2, 0 3) provides z=0 and (u,v,w)=(2,3,1) provides z=0, which are both correct.

There are different ways to implement the above truth table. In a first embodiment one may use addressable memory wherein (u,v,w) is the address of a memory content. The memory content is then the value of state of the truth table.

Figure 26:
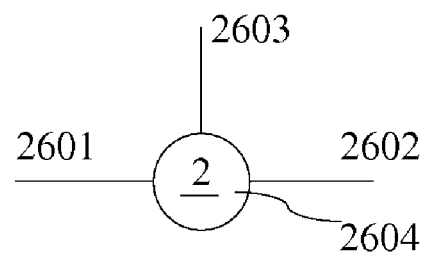
FIG. 26 is a diagram of an individually controlled n-valued switch.

In a second embodiment one may use n-valued inverters and individually controlled n-valued switches. The method for implementing a 2 input/single output n-valued logic function has been disclosed in U.S. Non-Provisional patent application Ser. No. 10/935,960 filed on Sep. 8, 2004 entitled: TERNARY AND MULTI-VALUE DIGITAL SIGNAL SCRAMBLERS, DESCRAMBLERS AND SEQUENCE GENERATORS, which is herein incorporated by reference in its entirety. It also has been further explained by the inventor in U.S. patent application Ser. No. 11/000,218 filed on Nov. 30, 2004 entitled: SINGLE AND COMPOSITE BINARY AND MULTI-VALUED LOGIC FUNCTIONS FROM GATES AND INVERTERS, which is herein incorporated by reference in its entirety. This method applies an individually controlled n-valued switch of which an example is shown in FIG. 26. This n-valued switch has an input 2601 and an output 2602 and a control input 2603. The switch itself is represented by a circle 2604 with a horizontal or a vertical line and a number. A horizontal line means the switch is conducting from input to output when the control input has the state as indicated by the number in the circle. In the example the switch is conduction when the control input has the state 2. A vertical line would mean the switch is non-conducting for the control input being in the indicated state.

Figure 27:
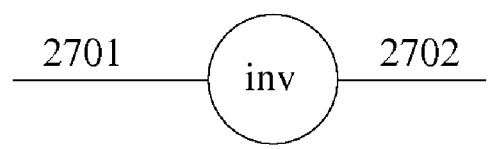
FIG. 27 is a diagram of an inverter.

FIG. 27 shows a diagram of an n-valued inverter 'inv' with an input 2701 and an output 2702. An n-valued inverter can be characterized by a vector having n elements. Each element means that a state represented by the position of the element is replaced by the value of that element in that position. Usually one numbers positions starting from origin 0. So the 4-valued identity inverter is inv1=[0 1 2 3]. If all possible states occur once the inverter is a reversible inverter. The inverter [3 2 1 0] is a reversible 4-valued inverter. Inverters can be implemented in different ways. The identity inverter is one of the easiest to realize as it is an uninterrupted connection, basically a piece of wire in an electrical case or optical fiber in an optical case. One way to visualize a combination of switches and inverters is to consider a switch an optical switch, wherein the control input perhaps has an optical level detector. When the optical detector detects the conducting state an optical signal on the input is uninterruptedly conducted to the output. When the optical detector detects a non-conductive state the switch goes into a non-conductive state. This can be done for instance in a MEMS device by way of a micro mirror.

Figure 28:
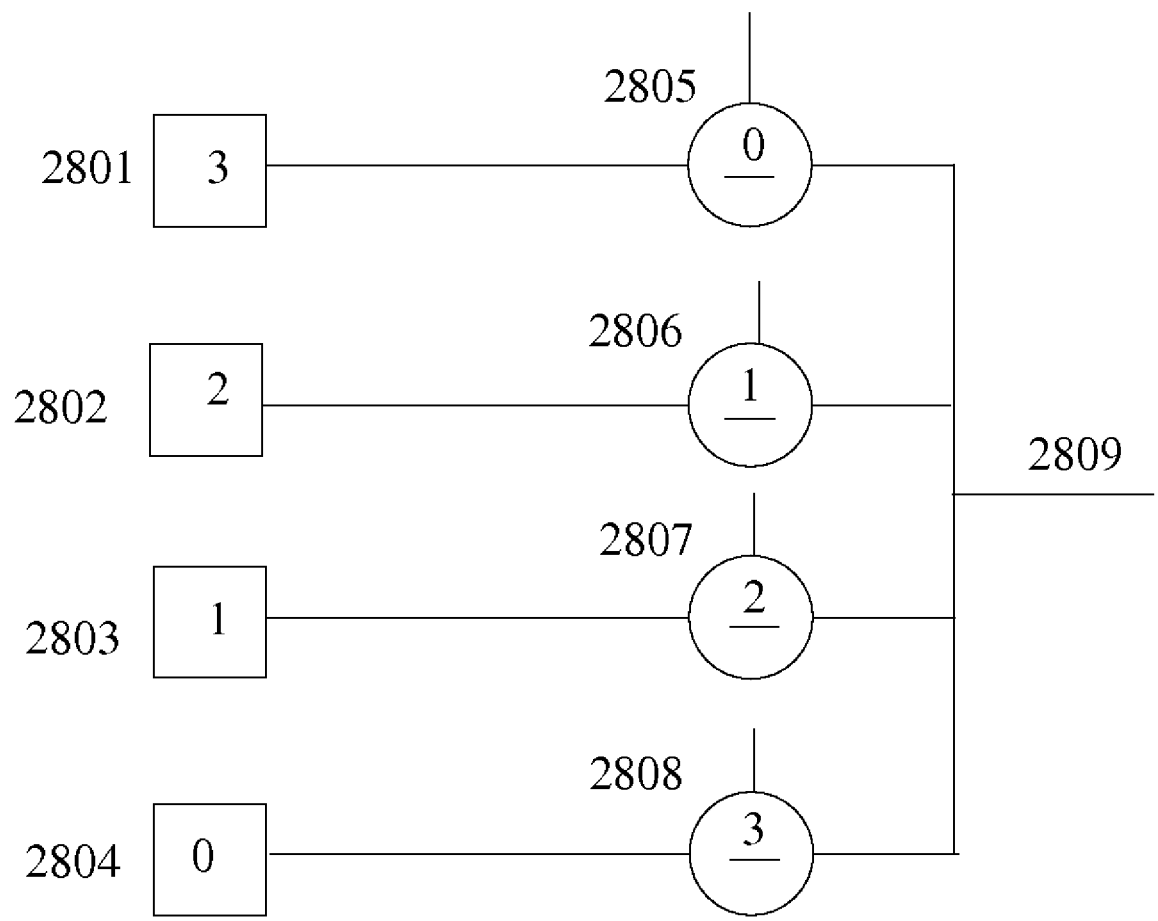
FIG. 28 is a diagram of a possible implementation of a 4-valued inverter.

FIG. 28 shows a possible implementation of the 4-valued inverter [3 2 1 0]. It comprises 4 signal sources 2801, 2802, 2803 and 2804 representing the states 3, 2, 1 and 0. Often the state 0 is represented by "absence of signal". In that case a source 0 is not required. A source is connected to an individually controlled switch switch. There are 4 individually controlled 4-valued switches: 2805, 2806, 2807 and 2808. Each switch is conducting for a different control signal. One can easily check that a signal according to inverter [3 2 1 0] is provided on 2809, depending on the value of the control signal. All control inputs receive the same control signal, only one switch will be in a conductive state. The switch 2804 is not required when the state 0 is represented by "absence of signal".

One way to realize the truth table of the 3 dimensional truth table of function sc is by using signal u as input to a circuit with inverters [0 1 2 3], inv1=[1 0 3 2], inv2=[2 3 0 1] and inv3=[3 2 1 0] and inv4=[0 1 2 3]. These inverters describe all occurring columns in the truth table. Inv4 is the identity inverter. Further more the path of a signal will be selected by individually controlled switches controlled by signals v and w.

Figure 29:
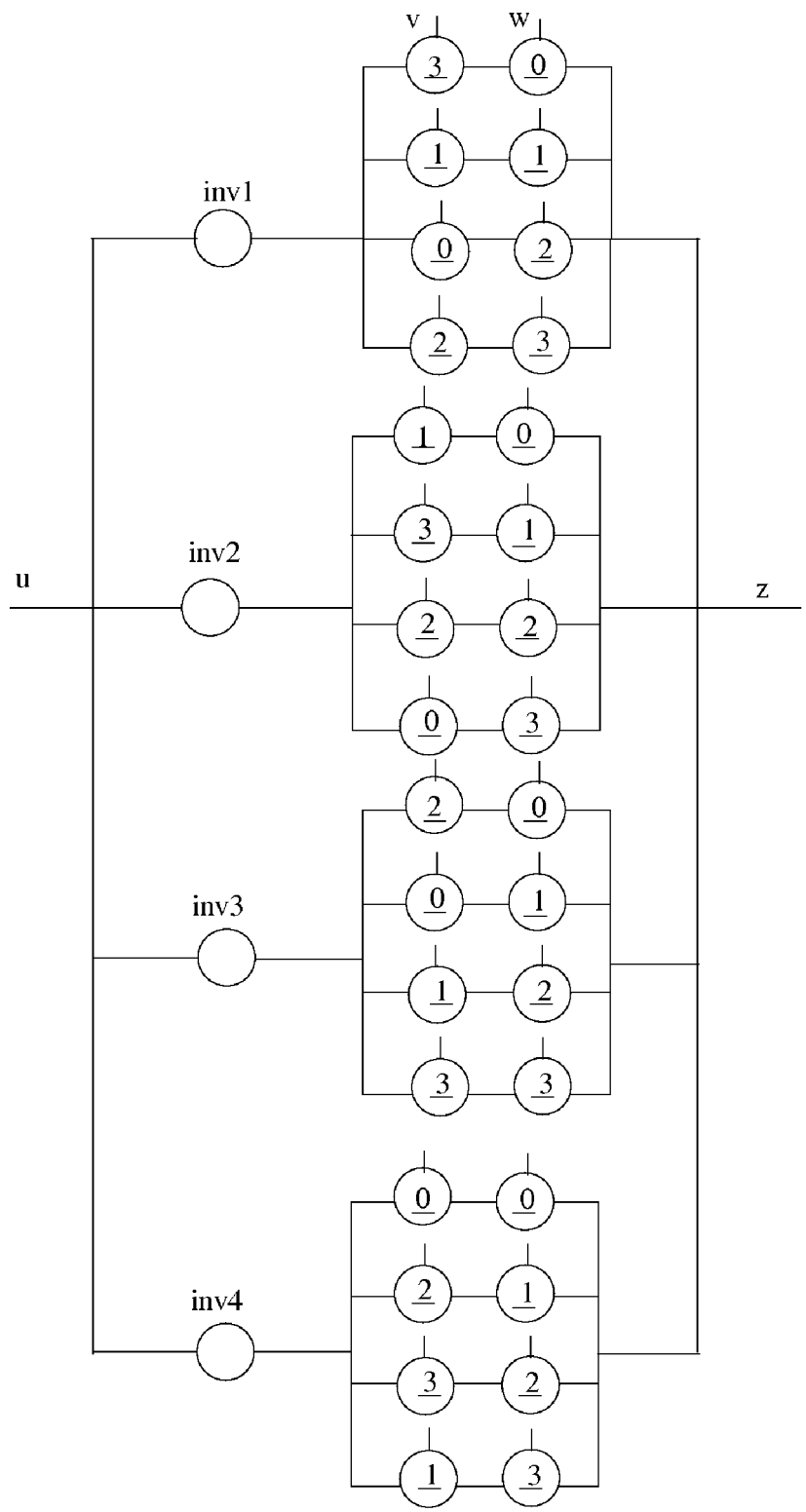
FIG. 29 is a diagram of a possible implementation of a truth table of a 3-input 4-valued logic device.

FIG. 29 shows a diagram of an implementation of the function sc with u as input, v and w as control signals for the individually controlled switches and an output z=u+v+w wherein z=sc(u,v,w).

In the next step an example will be provided of reducing the 4-valued truth table with multipliers at the inputs. The to be implemented truth table is the one for the expression in GF(4) z=2u+3v+2w. One can reduce the truth table to:

while continuing to use merely 4 inverters or even just 3 if one inverter is the identity inverter.

Figure 31:
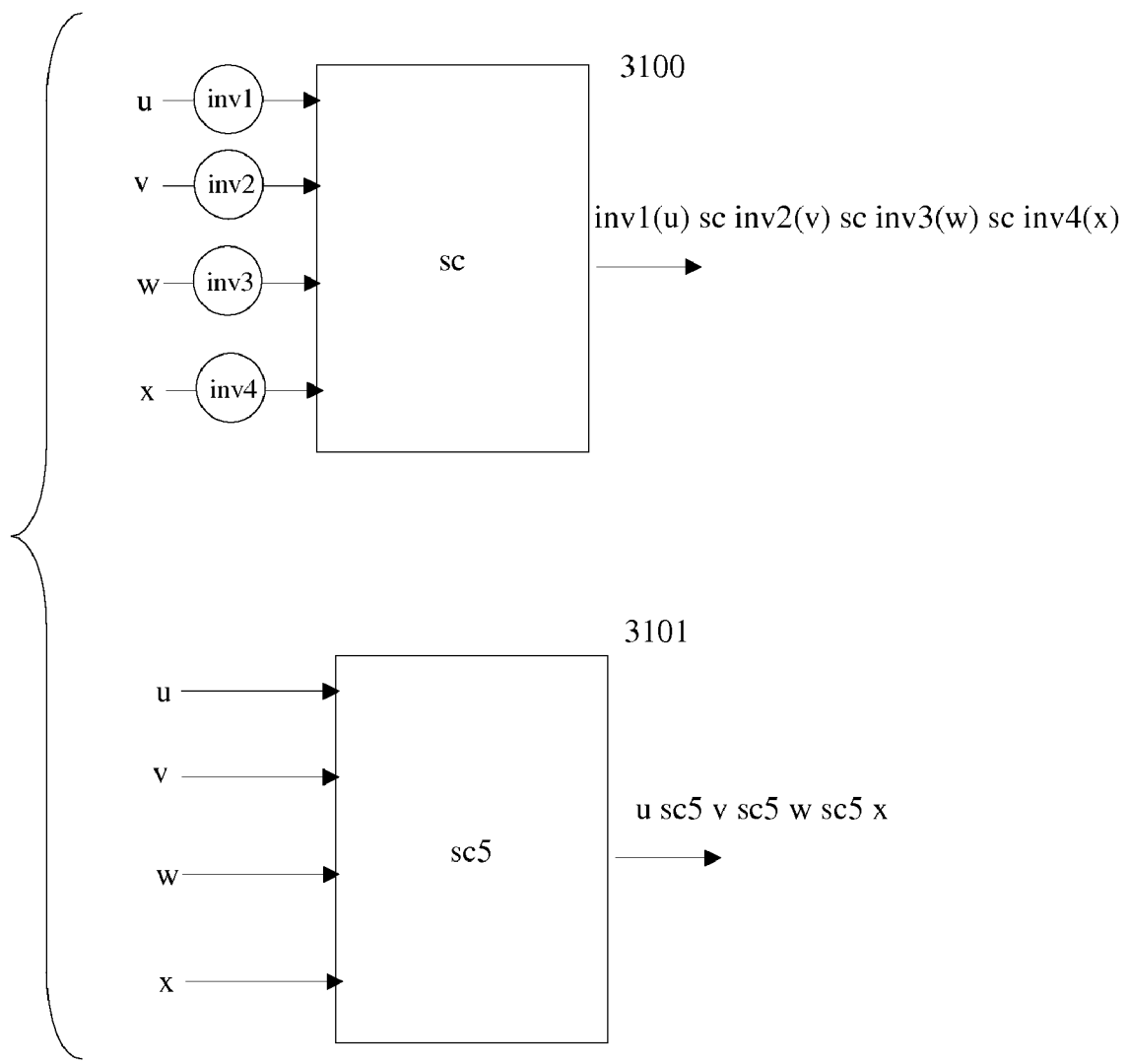
FIG. 31 is a diagram illustrating a 4-input logic device with inverters and an inverter reduced logic device.

As an additional example a 5-valued mod-5 adder sc with 4 inputs providing variable u, v, w and x is used in FIG. 31 diagram 3100. Further more the inputs have mod-5 multipliers inv1, inv2, inv3 and inv4. The circuit 3100 executes the expression inv1(*u*) sc inv2(*v*) sc inv3(*w*) sc inv4(*x*). Herein sc is associative. The truth tables of the mod-5 addition and the mod-5 multiplication are provided in the following tables.

| sc | 0 | 1 | 2 | 3 | 4 | x | 0 | 1 | 2 | 3 | 4 |
|----|---|---|---|---|---|---|---|---|---|---|---|
| 0  | 0 | 1 | 2 | 3 | 4 | 0 | 0 | 0 | 0 | 0 | 0 |
| 1  | 1 | 2 | 3 | 4 | 0 | 1 | 0 | 1 | 2 | 3 | 4 |
| 2  | 2 | 3 | 4 | 0 | 1 | 2 | 0 | 2 | 4 | 1 | 3 |
| 3  | 3 | 4 | 0 | 1 | 2 | 3 | 0 | 3 | 1 | 4 | 2 |
| 4  | 4 | 0 | 1 | 2 | 3 | 4 | 0 | 4 | 3 | 2 | 1 |

Applying the reduction method being an aspect of the present invention allows reducing the circuit of FIG. 31 3100 to the circuit of FIG. 31 3101 having no multipliers. The 3101 circuit executes or evaluates the expression: u sc5 v sc5 w sc5 x; herein sc5 is the multiplier reduced function sc according to the multipliers or inverters inv1, inv2, inv3 and inv4. The

| sc3 w = 0 | | v 0 | 1 | 2 | 3 | w = 1 | v 0 | 1 | 2 | 3 | w = 2 | v 0 | 1 | 2 | 3 | w = 3 | v 0 | 1 | 2 | 3 |
|---|---|---|---|---|---|---|---|---|---|---|---|---|---|---|---|---|---|---|---|---|
|   | 0 | 0 | 3 | 1 | 2 |   | 2 | 1 | 3 | 0 |   | 3 | 0 | 2 | 1 |   | 1 | 2 | 0 | 3 |
| u | 1 | 2 | 1 | 3 | 0 |   | 0 | 3 | 1 | 2 |   | 1 | 2 | 0 | 3 |   | 3 | 0 | 2 | 1 |
|   | 2 | 3 | 0 | 2 | 1 |   | 1 | 2 | 0 | 3 |   | 0 | 3 | 1 | 2 |   | 2 | 1 | 3 | 0 |
|   | 3 | 1 | 2 | 0 | 3 |   | 3 | 0 | 2 | 1 |   | 2 | 1 | 3 | 0 |   | 0 | 3 | 1 | 2 |

One can see that the multiplier reduced truth table of sc3 has 4 subtables, of which each can be described by 4 different inverters. One can thus implement the truth table of the multiplier-less truth table by a circuit similar to the one of FIG. 29.

The limited number of inverters is actually an added benefit of using multi-input adders with or without multipliers and contributes to possibly greatly simplifying the implementation of multi-input adders.

Figure 30:
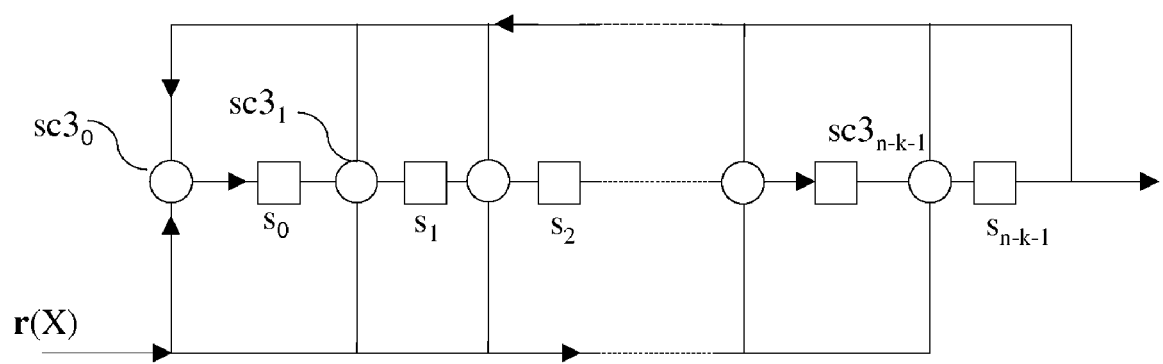
FIG. 30 is a diagram of a polynomial calculation is accordance with an aspect of the present invention.

Accordingly one can replace the combined Galois multiplier (the forward connected LFSR part) and the divider (the feedback connected LFSR part) with individual multipliers connected to adders in GF(n) as shown in FIG. 14, by the circuit as shown in FIG. 30. This circuit has no individual multipliers and has its adders replaced by the multiplier reduced functions.

One can use the reduction method for other k-input configurations with multipliers for other n-valued adders. The method will work for other functions than adders, however the non-associative aspect will affect the realization. One can create 4 or more input adders with multipliers. This will result into more dimensional truth tables. The striking effect is that independent of the multipliers all truth tables will have the same n-valued inverters as columns in the subtables. The same applies to the rows. A subtable in a 4-valued truth table has 4 inverters. Accordingly more dimensional truth tables will have at an increasing rate inverters in common with other subtables. Using an implementation as shown in FIG. 29 this means an increasing opportunity for reduction of switches resulting truth table is a 5×5 set of 5×5 subtables. However each subtable can be realized from at most 5 of the same inverters.

Assume that in1, in2, inv3, inv4 represent the mod-5 multipliers 4, 2, 3, 4. As a result a reduced subtable has the following appearance as shown in the following table.

| sub | 0 | 1 | 2 | 3 | 4 |
|-----|---|---|---|---|---|
| 0   | 0 | 2 | 4 | 1 | 3 |
| 1   | 4 | 1 | 3 | 0 | 2 |
| 2   | 3 | 0 | 2 | 4 | 1 |
| 3   | 2 | 4 | 1 | 3 | 0 |
| 4   | 1 | 3 | 0 | 2 | 4 |

Each of the 25 subtables have a permutation of the columns (or the rows) of the above table.

A n-valued adder over GF(n) with k-inputs, wherein each input may have a multiplier over GF(n) has a truth table that can be reduced according to the multipliers. The reduced truth table has $n^{(k-2)}$ n×n subtables. Each subtable can be realized by at most n inverters, wherein each subtable uses the same inverters.

The use of multi-valued LFSRs is prominent in RS coding. This use is part of what is known in general as polynomial arithmetic. The coefficients of a polynomial exist within a finite field or a Galois Field, usually represented as GF(n). Two important operations in polynomial arithmetic are the multiplication and the division. An example of a combined multiplication and division was provided in FIG. 14 and in its multiplier reduced form in FIG. 18 and FIG. 30. Polynomial arithmetic in a finite field is known. To illustrate the methods and apparatus provided as aspects of the present invention the following arithmetical examples are provided. They are from Lecture Notes by John Gill of Stanford University, entitled: EE 387 Handout # 37, Lecture #18, Cyclic Codes and Polynomials (hereafter "Gill"). One is reminded that these examples are provided to illustrate aspects of the invention, and not to explain the concepts of polynomial arithmetic or calculations which are assumed to be known.

Figure 32:
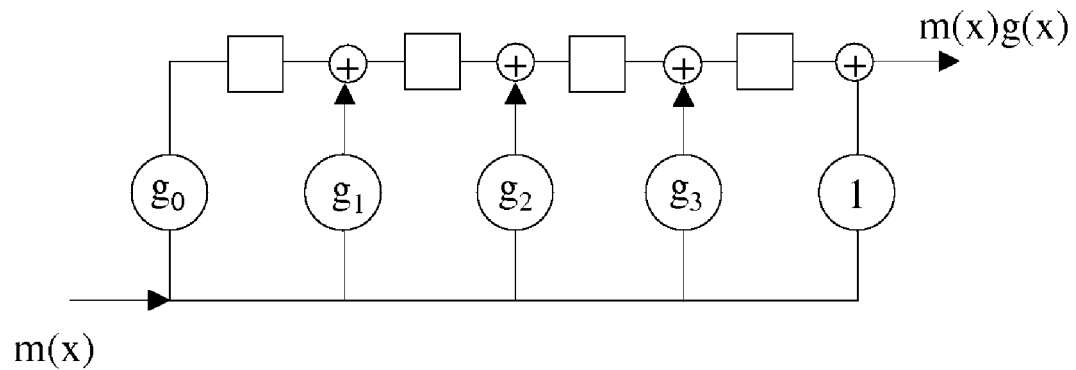
FIG. 32 is a diagram of a polynomial calculation in known art.
Figure 33:
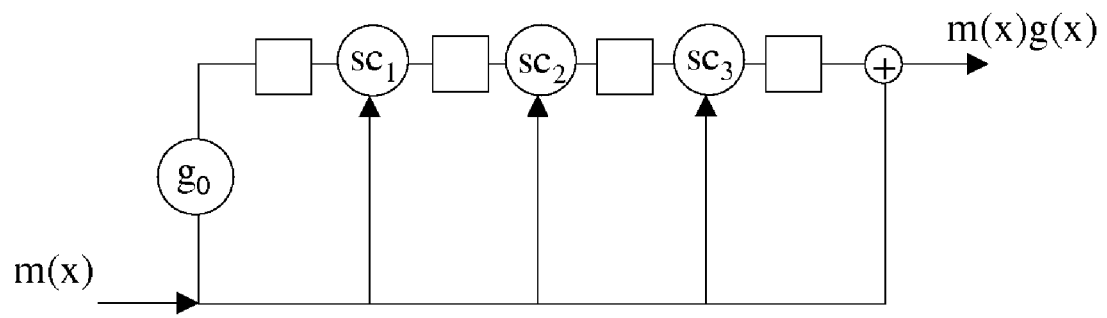
FIG. 33 is a diagram of a polynomial calculation in accordance with an aspect of the present invention.

Polynomial multiplication can be executed by LFSRs in Galois or in Fibonacci configuration. FIG. 32 shows in diagram from "Gill" a n-valued polynomial multiplication in GF(n) of a polynomial m(x) with g(x), implemented in an LFSR in Galois configuration with multipliers and adders over GF(n), wherein multipliers implement coefficients of g(x). FIG. 33 shows an equivalent diagram of the polynomial multiplication of FIG. 32 according to an aspect of the present invention wherein adders with multipliers at inputs are reduced to n-valued logic functions sc1, sc2 and sc3.

Figure 34:
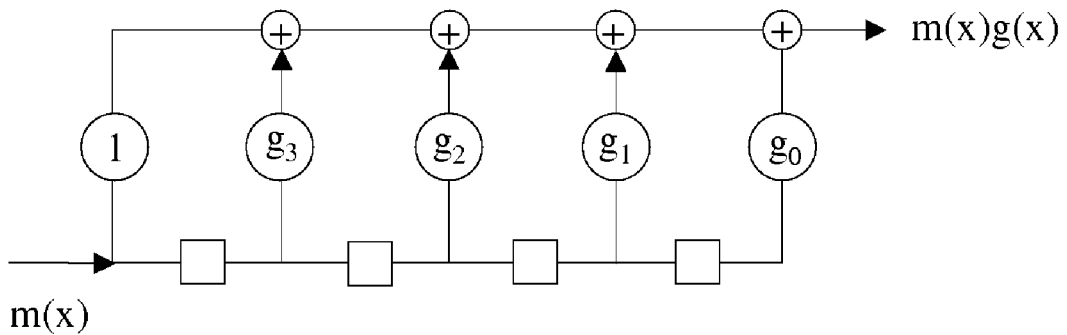
FIG. 34 is another diagram of a polynomial calculation in known art.
Figure 35:
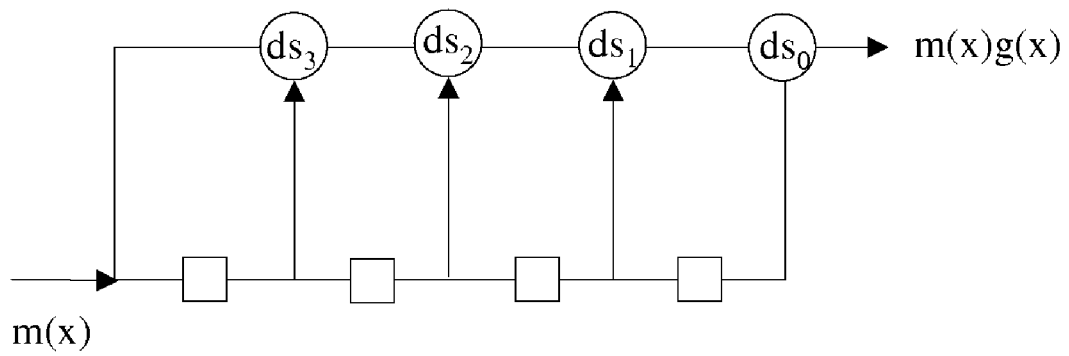
FIG. 35 is another diagram of a polynomial calculation in accordance with an aspect of the present invention.

FIG. 34 shows a diagram according to "Gill" of a polynomial multiplication in Fibonacci configuration with adders and multipliers over GF(n). FIG. 35 shows an equivalent diagram of the polynomial multiplication with a reduced number of multipliers over GF(n) according to an aspect of the present invention with n-valued logic functions ds0, ds1, ds2 and ds3.

Figure 36:
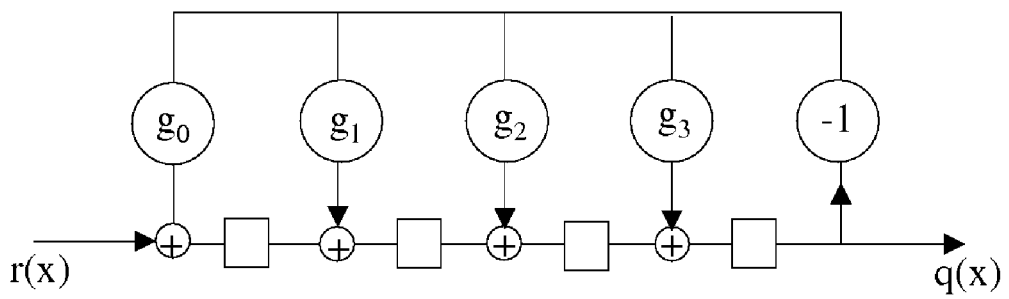
FIG. 36 is another diagram of a polynomial calculation in known art.
Figure 37:
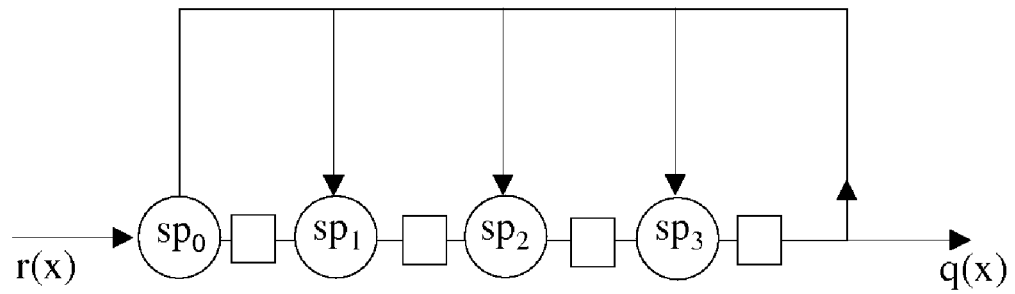
FIG. 37 is another diagram of a polynomial calculation in accordance with an aspect of the present invention.

FIG. 36 shows a diagram according to "Gill" of a polynomial division in Galois configuration with adders and multipliers and adders over GF(n). FIG. 37 shows an equivalent diagram of the polynomial division with a reduced number of multipliers over GF(n) according to an aspect of the present invention and with n-valued logic functions sp0, sp1, sp2 and sp3.

Figure 38:
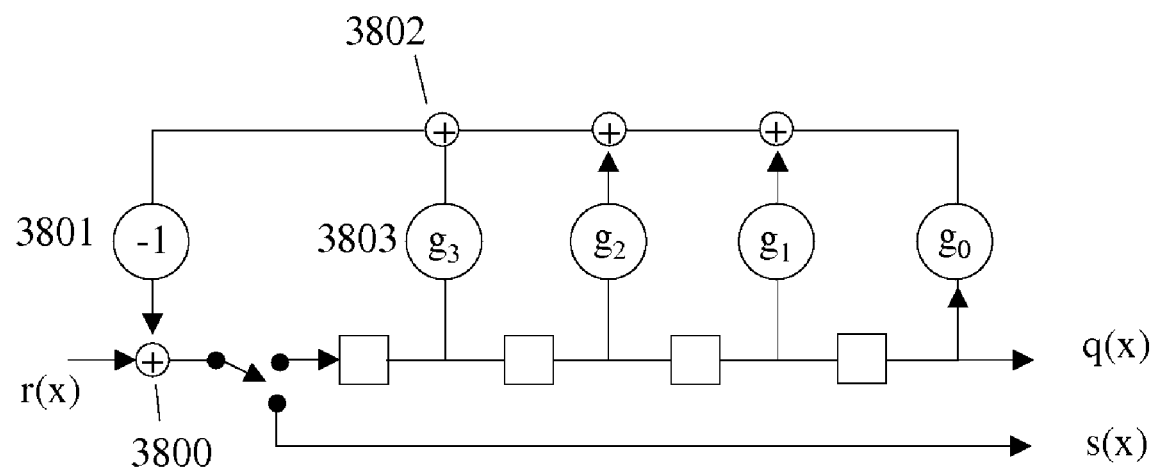
FIG. 38 is another diagram of a polynomial calculation in known art.
Figure 39A:
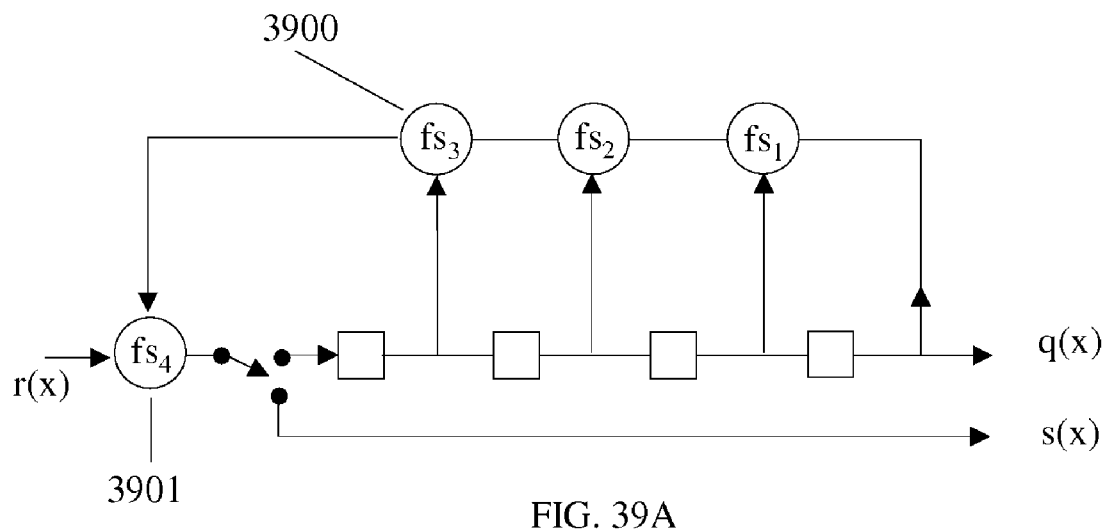
FIGS. 39A and 39B are diagrams of a polynomial calculation performed in accordance with an aspect of the present invention.
Figure 39B:
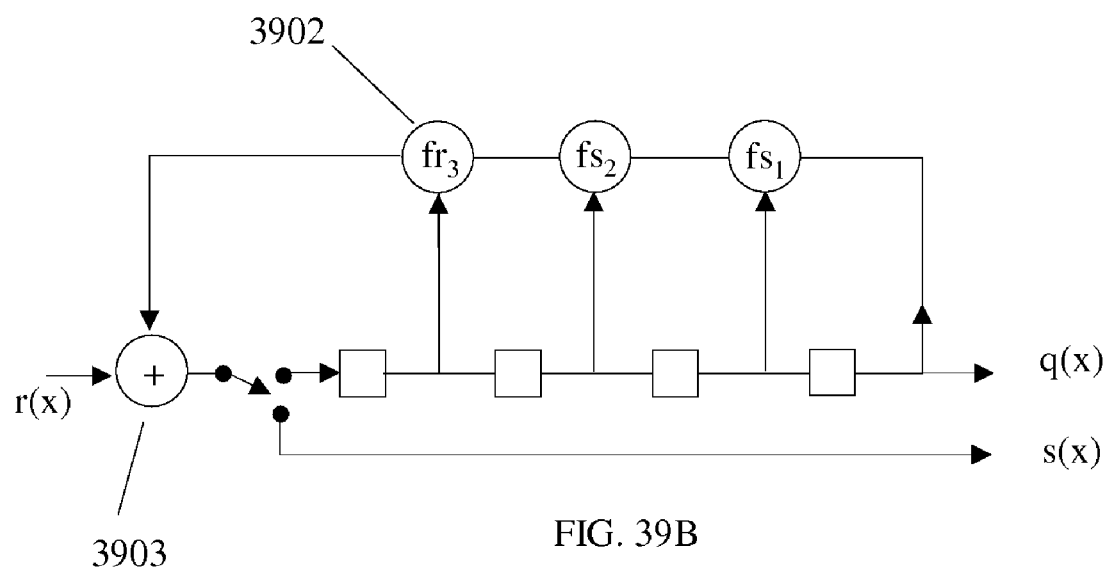

FIG. 38 shows a diagram according to "Gill" of a polynomial division in Fibonacci configuration with adders and multipliers and adders over GF(n). FIGS. 39A and 39B show an equivalent diagrams of the polynomial division with a reduced number of multipliers over GF(n) according to an aspect of the present invention and with n-valued logic functions fs1, fs2, and fs3 in FIG. 39A and fs1, fs2 and fr3 in FIG. 39B.

A multiplication −1 in GF(n) is also an inverter in GF(n). A value (−a) in GF(n) can be defined as: a+(−a)=0. In the case of n being a prime numbers (−a)=(−a+n) mod-n. In case of GF(n) is an extended binary field then (−a)=a. One may reduce the multiplier −1 into the n-valued logic functions as is shown in FIG. 37 and FIG. 39A and FIG. 39B.

The circuits of FIGS. 39A and 39B perform the same operation. However in FIG. 39A in 3900 the function fs3 is created from adder 3802 and multiplier 3803 in FIG. 38 and in 3901 the function fs4 is crated from adder 3800 and multiplier 3801 in FIG. 38.

In FIG. 39B the function 39xx remains an adder and function 3903 is created by combining adder 3802 and multiplier 3803, followed by modifying the truth table of the function by the multiplier 3801. Modifying a truth table by a multiplier in an output is relatively simple. It is a substitution of a state which is represented by a position in an inverter or multiplier by the value or state of the multiplier or inverter in that position. As an example one can take the following 5-valued adder and multiplier truth tables.

| sc | 0 | 1 | 2 | 3 | 4 | x | 0 | 1 | 2 | 3 | 4 |
|---|---|---|---|---|---|---|---|---|---|---|---|
| 0 | 0 | 1 | 2 | 3 | 4 | 0 | 0 | 0 | 0 | 0 | 0 |
| 1 | 1 | 2 | 3 | 4 | 0 | 1 | 0 | 1 | 2 | 3 | 4 |
| 2 | 2 | 3 | 4 | 0 | 1 | 2 | 0 | 2 | 4 | 1 | 3 |
| 3 | 3 | 4 | 0 | 1 | 2 | 3 | 0 | 3 | 1 | 4 | 2 |
| 4 | 4 | 0 | 1 | 2 | 3 | 4 | 0 | 4 | 3 | 2 | 1 |

Assume the truth table of sc with a multiplier (−1). A multiplier (−1) in mod-5 is identical to an inverter [0 4 3 2 1] or multiplying by 4 mod-5. The resulting truth table of the modified function scm is provided in the following table.

| scm | 0 | 1 | 2 | 3 | 4 |
|---|---|---|---|---|---|
| 0 | 0 | 4 | 3 | 2 | 1 |
| 1 | 4 | 3 | 2 | 1 | 0 |
| 2 | 3 | 2 | 1 | 0 | 4 |
| 3 | 2 | 1 | 0 | 4 | 3 |
| 4 | 1 | 0 | 4 | 3 | 2 |

Figure 40:
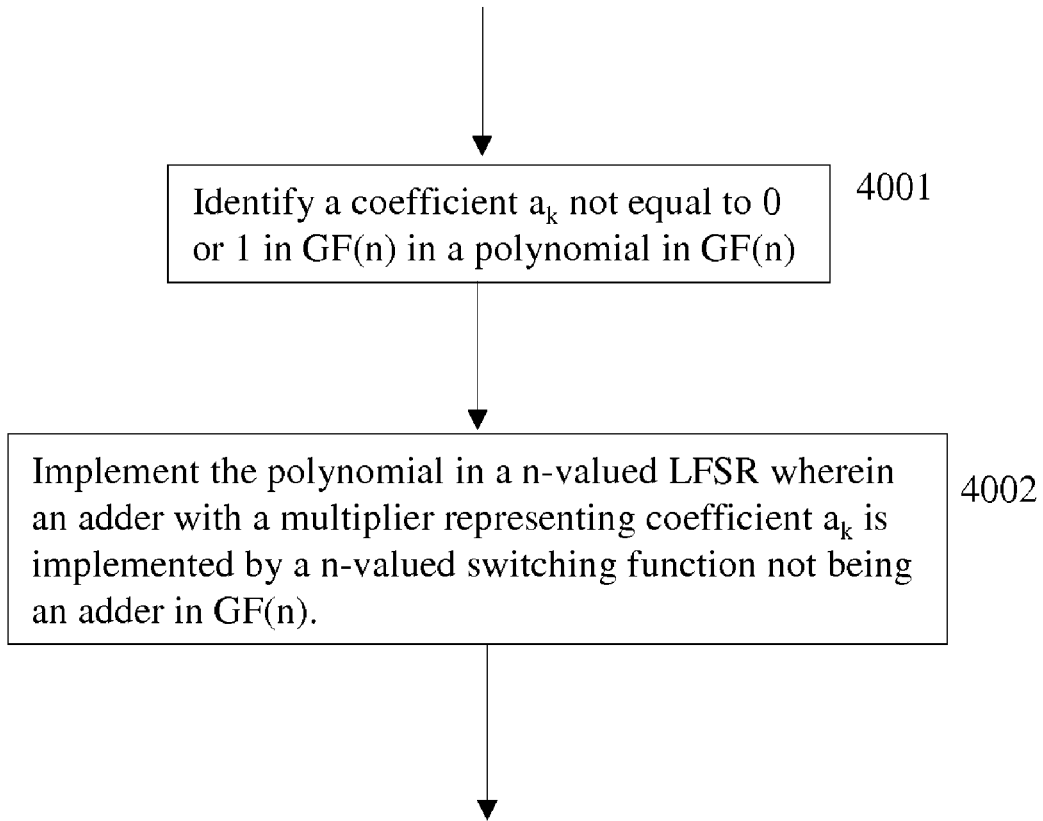
FIG. 40 is a flow diagram in accordance with an aspect of the present invention.

FIG. 40 shows a flow diagram of a possible approach in applying a multiplier reduction method. In step 4001 one can identify a coefficient $a_k$ not equal to 0 or 1 in GF(n) in a polynomial in GF(n) applied in an expression of polynomial arithmetic or for a RS coder or decoder for instance. In step 4002 one implements the polynomial in a n-valued LFSR wherein an adder with a multiplier representing coefficient $a_k$ is implemented by a n-valued switching function not being an adder in GF(n). One may repeat these steps until as many multipliers as desired or as possible have been eliminated.

The here provided methods and apparatus in multiplier reduction can be applied in any system or application using Galois Field arithmetic which initially implement an adder in GF(n) and ay least one multiplier over GF(n) at one input of the adder. The adder may have more than 2 inputs. The Galois Field arithmetic may be applied for calculation of remainders of a division, for generating symbols to be used in syndrome calculations or for any other purpose. It may also be used for n-valued syndrome calculations. It may include Galois Field multiplication. It may also combine Galois Field division and multiplication. The Galois Field calculation may take place with n-valued LFSRs. It may also take place with addressable memories as disclosed by the inventor in U.S. patent application Ser. No. 11/427,498, filed Jun. 29, 2006 entitled THE CREATION AND DETECTION OF BINARY AND NON-BINARY PSEUDO-NOISE SEQUENCES NOT USING LFSR CIRCUITS, U.S. patent application Ser. No. 11/534, 837, filed Sep. 25, 2006, entitled GENERATION AND SELF-SYNCHRONIZING DETECTION OF SEQUENCES USING ADDRESSABLE MEMORIES and in U.S. patent application Ser. No. 11/555,730, filed Nov. 2, 2006 entitled SCRAMBLING AND SELF-SYNCHRONIZING DESCRAMBLING METHODS FOR BINARY AND NON-BINARY DIGITAL SIGNALS NOT USING LFSRs, which are all incorporated herein by reference in their entirety.

Methods, apparatus and systems here provided all apply n-valued LFSRs. When applied in error correcting coding and decoding they are usually based on polynomial arithmetic, using adders and multipliers over GF(n). As an illustrative example coders and syndrome calculators for RS-coders are provided. The term coder herein refers to encoders as well as decoders, when they use multi-valued LFSRs. In many cases the structure of an encoder is similar to a decoder. The decoder is usually applied to calculate if it can achieve the same result as the encoder. While the Reed Solomon coder is used as illustrative example for error correction, LFSRs are used in other multi-valued error correcting and detecting coders. For instance the multi-valued coder can be used in Cyclic Redundancy Check (CRC) codes, wherein a remainder of a codewords is generated by an LFSR from a codeword. While CRC codes are usually applied to binary signals, they can also be applied to n-valued signals, by using an n-valued LFSR with adders and multipliers over GF(n). As such they are here fully contemplated. In a way n-valued CRC codes may be considered being not unlike a partial RS code.

Another LFSR based coder is an n-valued convolutional coder, for instance as disclosed by the inventor in U.S. patent application Ser. No. 11/566,725, filed on Dec. 5, 2006 entitled: ERROR CORRECTING DECODING FOR CONVOLUTIONAL AND RECURSIVE SYSTEMATIC CONVOLUTIONAL ENCODED SEQUENCES, which is incorporated herein by reference in its entirety. It is shown in the cited patent application that one can create a matching convolutional decoder to an encoder, comprised of an n-valued LFSR. The convolutional coders (both encoder and decoder) may be created from an n-valued LFSR having adders and multipliers over GF(n), which can be multiplier reduced by applying a method here provided as an aspect of the present invention.

A difference between coders and polynomial calculators here disclosed and other coding methods and apparatus as disclosed for instance by the inventor in cited U.S. patent application Ser. No. 10/935,960 is that the coders an polynomial calculators work on a codeword or polynomial of a specific length of symbols. The coders as disclosed in 10/935, 960 have not such limitation and operate as continuous coders, generally known as scramblers and descramblers.

It should be clear to one skilled in the art that coders, disclosed here in either Fibonacci or Galois configuration, may be operated as scramblers or descramblers and can be reduced in multipliers by methods provided here.

It is envisioned that one skilled in the art, after becoming familiar with the methods and apparatus here provided, will recognize certain n-valued logic functions that will implement the truth table of an adder with multipliers over GF(n). That familiarity then may circumvent the necessity to first design a solution based on adders and multipliers and allow a person to design directly with multiplier reduced n-valued functions. In essence however such a design is still based on the methods which are aspects of the present invention. It is believed by the inventor that currently no n-valued error correcting or error detecting method or apparatus exists or has been disclosed that uses or includes an n-valued functions that is not an adder over GF(n). Accordingly it can be reasonably assumed that coders with n-valued LFSRs having an n-valued function that can be expanded to adders and multipliers over GF(n) are obtained through the methods or apparatus here provided.

Figure 41:
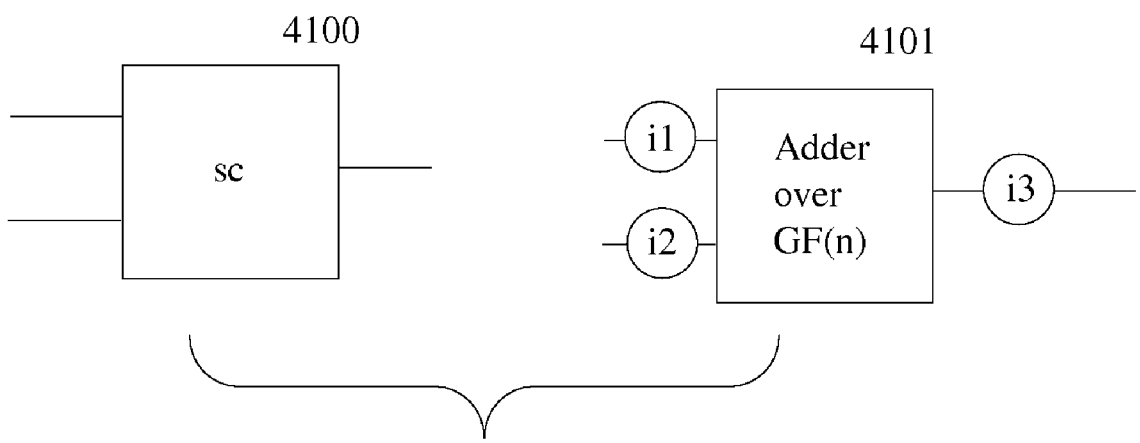
FIG. 41 is a diagram illustrating expansion of an n-valued logic function.

FIG. 41 shows a diagram of how one may analyze a function with two inputs. A similar approach may be used in multi-input functions. A function 'sc' as 4100 has a n-valued truth table that is not an adder over GF(n). One may expand such function to an adder over GF(n) which has a multiplier over GF(n) (i1 and i2) at each input and a multiplier (i3) at the output as in 4101.

It should have been recognized by one skilled in the art that a critical aspect of the present invention is the realization that values used in polynomial calculations in GF(n) may be treated as switching states. Multipliers and additions in GF(n) may be state modifying switching operations. It is believed that treating operations in GF(n) as arithmetical operations in GF(n) rather than n-valued switching operations have precluded ones skilled in the art of making the steps herein explained by the inventor. The prior art in error correcting coding like "Lin-Costello" treats polynomial calculations almost exclusively in terms of arithmetical expressions. Accordingly prior art teaches to one skilled in the art to consider a polynomial expression like: $g(X)=g_0+g_1X+g_2X^2+\ldots+g_{n-k-1}X^{n-k-1}+X^{n-k}$ in an error correcting coding scheme to be considered as a Galois configured LFSR wherein terms $g_0, g^1, g_{k-1}$, are constant multipliers and + is an addition over GF(n). The expression reflects the n-valued LFSR as presented in FIG. 4. For correcting detected errors (such as in an RS code) one will have to manipulate the polynomial expression and solve it as a syndrome equation.

The above expression can be reduced to: $g(X)=g_0sc_1X\ sc_2X^2sc_3\ldots sc_{n-k-1}X^{n-k-1}+X^{n-k}$. This expression can be implemented in accordance with an aspect of the present invention by an LFSR in Galois configuration as is shown in FIG. 5. One can see that all multipliers have disappeared except $g_0$. Also all adders have disappeared except the last one. The new expression will generate the same result as the old one. However the LFSR needs to be implemented in the order of the taps, as the terms are not associative.

RS-coders and CRC coders are widely applied and form critical elements in for instance communications and data storage applications. While it is believed that the methods and apparatus here provided have been sufficiently enabled several illustrative examples will be provided next that confirm the herein provided approach.

Figure 42:
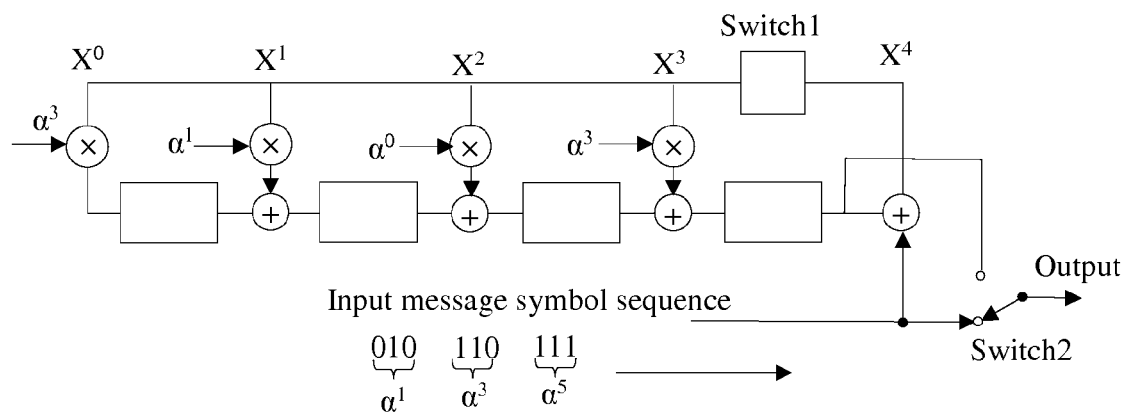
FIG. 42 is a diagram of a known Reed Solomon coder.
Figure 43:
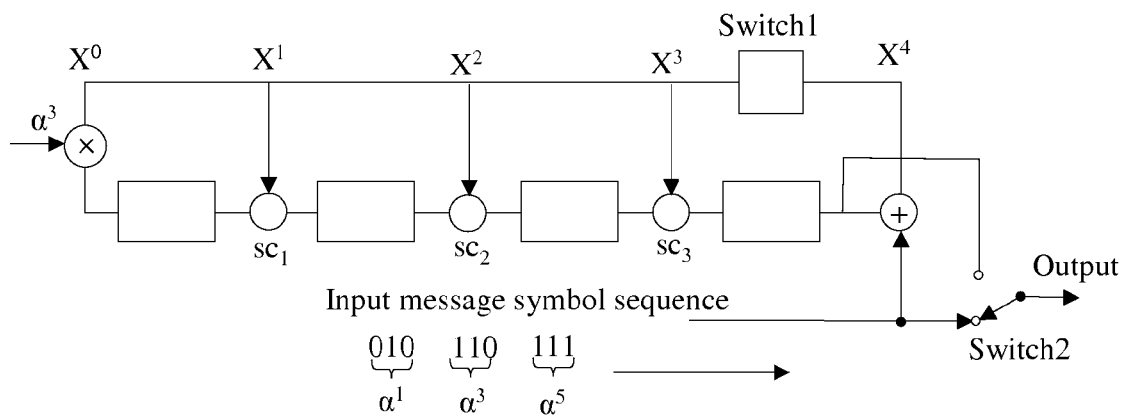
FIG. 43 is a diagram of a Reed Solomon coder in accordance with an aspect of the present invention.

One calculated example was provided with the "Sklar" example. FIG. 42 shows a diagram of the original (not reduced) 8-valued RS-coder and FIG. 43 shows a diagram of the equivalent 8-valued coder in accordance with an aspect of the present invention.

Figure 44:
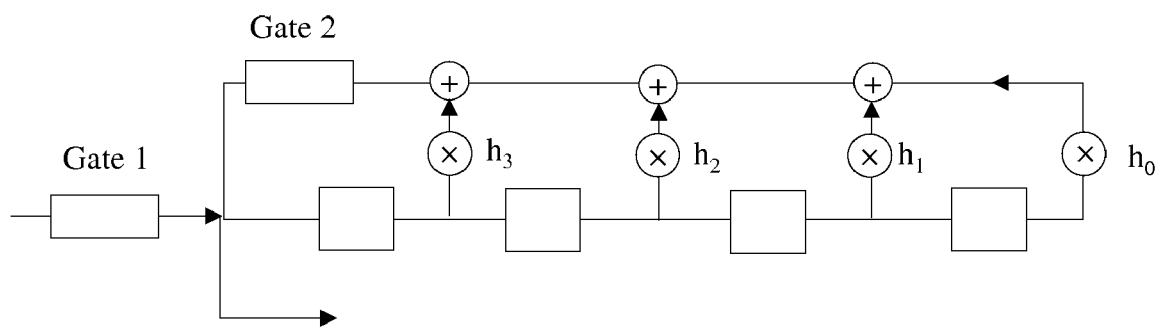
FIG. 44 is a diagram of an RS coder in Fibonacci configuration and is known.

FIG. 44 shows a n-valued (7,4) RS coder in Fibonacci configuration, wherein 4 n-valued symbols are used to generate 3 check symbols. Herein the data symbols are entered into the shift register by making gate 1 conducting and gate 2 non-conducting. After 4 clock pulses the situation reverses and gate 2 is conducting and gate 1 is non-conducting. One then runs the coder for 3 clock pulses to generate the 3 check symbols of the RS code.

Figure 45:
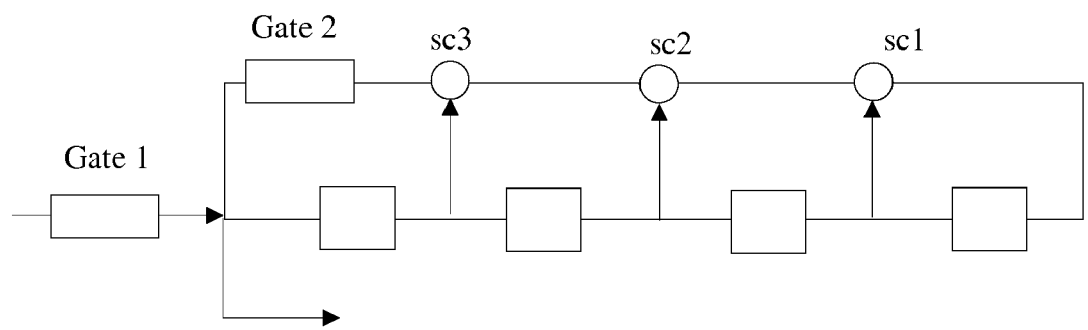
FIG. 45 is a diagram of an RS coder in accordance with an aspect of the present invention.

The advantage of the Fibonacci configurations is that the n-valued check symbols can be outputted directly on an output and have not to be shifted out of the LFSR. A (7,4) RS-coder in Fibonacci configuration is shown in FIG. 44. The generic configuration of this coder with the multipliers can be found in "Lin-Costello". This coder can be reduced according to the method of the present invention by reducing multipliers h3, h2, h1 and h0 into the adder functions. This is shown in FIG. 45. The advantage of the selected approach is that one is not required to work with functions in GF(n) to find sets of multipliers that will create appropriate RS-coders. An appropriate RS-coder in for instance FIG. 45 must be able to generate codewords of 7 symbols wherein each codeword has at most 3 symbols in common with every other codeword. This is not a trivial problem to solve, but can be achieved in a reasonable time with a computer program for the 8-valued case with h0=1.

For instance the following values for the 8-valued multipliers [h3 h3 h1 h0] will enable an RS coder as here defined: [2 4 2 1]; [3 4 3 1]; [6 1 4 1], [5 7 5 1] [7 1 6 1] etc.

As a further example the configuration [h3 h2 h1 h0]=[2 4 2 1] will be further examined. One should first create the functions sc1, sc2 and sc3 in accordance with the multiplier reduction rule. The following tables provide the truth tables of sc1, sc2 and sc3 as applied in the diagram of FIG. 45.

| sc3 | 0 | 1 | 2 | 3 | 4 | 5 | 6 | 7 |
|---|---|---|---|---|---|---|---|---|
| 0 | 0 | 1 | 2 | 3 | 4 | 5 | 6 | 7 |
| 1 | 2 | 4 | 0 | 5 | 1 | 3 | 7 | 6 |
| 2 | 3 | 7 | 5 | 0 | 6 | 2 | 4 | 1 |
| 3 | 4 | 2 | 1 | 6 | 0 | 7 | 3 | 5 |
| 4 | 5 | 6 | 3 | 2 | 7 | 0 | 1 | 4 |
| 5 | 6 | 5 | 7 | 4 | 3 | 1 | 0 | 2 |
| 6 | 7 | 3 | 6 | 1 | 5 | 4 | 2 | 0 |
| 7 | 1 | 0 | 4 | 7 | 2 | 6 | 5 | 3 |

| sc2 | 0 | 1 | 2 | 3 | 4 | 5 | 6 | 7 |
|---|---|---|---|---|---|---|---|---|
| 0 | 0 | 1 | 2 | 3 | 4 | 5 | 6 | 7 |
| 1 | 4 | 2 | 1 | 6 | 0 | 7 | 3 | 5 |
| 2 | 5 | 6 | 3 | 2 | 7 | 0 | 1 | 4 |
| 3 | 6 | 5 | 7 | 4 | 3 | 1 | 0 | 2 |
| 4 | 7 | 3 | 6 | 1 | 5 | 4 | 2 | 0 |
| 5 | 1 | 0 | 4 | 7 | 2 | 6 | 5 | 3 |
| 6 | 2 | 4 | 0 | 5 | 1 | 3 | 7 | 6 |
| 7 | 3 | 7 | 5 | 0 | 6 | 2 | 4 | 1 |

| sc1 | 0 | 1 | 2 | 3 | 4 | 5 | 6 | 7 |
|---|---|---|---|---|---|---|---|---|
| 0 | 0 | 1 | 2 | 3 | 4 | 5 | 6 | 7 |
| 1 | 2 | 4 | 0 | 5 | 1 | 3 | 7 | 6 |
| 2 | 3 | 7 | 5 | 0 | 6 | 2 | 4 | 1 |
| 3 | 4 | 2 | 1 | 6 | 0 | 7 | 3 | 5 |
| 4 | 5 | 6 | 3 | 2 | 7 | 0 | 1 | 4 |
| 5 | 6 | 5 | 7 | 4 | 3 | 1 | 0 | 2 |
| 6 | 7 | 3 | 6 | 1 | 5 | 4 | 2 | 0 |
| 7 | 3 | 7 | 5 | 0 | 6 | 2 | 4 | 1 |

Because of the structure of the LFSR the multipliers are reflected in the position of the inverters in rows in the truth tables. However the inverters remain the same. This means that (like the multi-input adder) one can realize the different truth tables with a limited set of 8-valued inverters and 8-valued switches. This applies to all n-valued Fibonacci and Galois configurations wherein one adder function and one multiplier in GF(n) are combined.

As an example one may run the coders of FIG. 44 and FIG. 45 for different inputs. First one runs the coder of FIG. 44 for inputs [0 1 2 3]; [1 3 5 7]; [7 6 6 6] and [1 0 1 0].

| FIG. 44 | input | | | | check symbols | | |
|---|---|---|---|---|---|---|---|
| word 1 | 0 | 1 | 2 | 3 | 4 | 5 | 4 |
| word 2 | 1 | 3 | 5 | 7 | 6 | 4 | 2 |
| word 3 | 7 | 6 | 6 | 6 | 1 | 3 | 5 |
| word 4 | 1 | 0 | 1 | 0 | 2 | 5 | 0 |

Applying the same inputs to the reduced configuration of FIG. 45 will provide:

| FIG. 45 | input | | | | check symbols | | |
|---|---|---|---|---|---|---|---|
| word 1 | 0 | 1 | 2 | 3 | 4 | 5 | 4 |
| word 2 | 1 | 3 | 5 | 7 | 6 | 4 | 2 |
| word 3 | 7 | 6 | 6 | 6 | 1 | 3 | 5 |
| word 4 | 1 | 0 | 1 | 0 | 2 | 5 | 0 |

This demonstrates that the two coders are equivalent.

Figure 46:
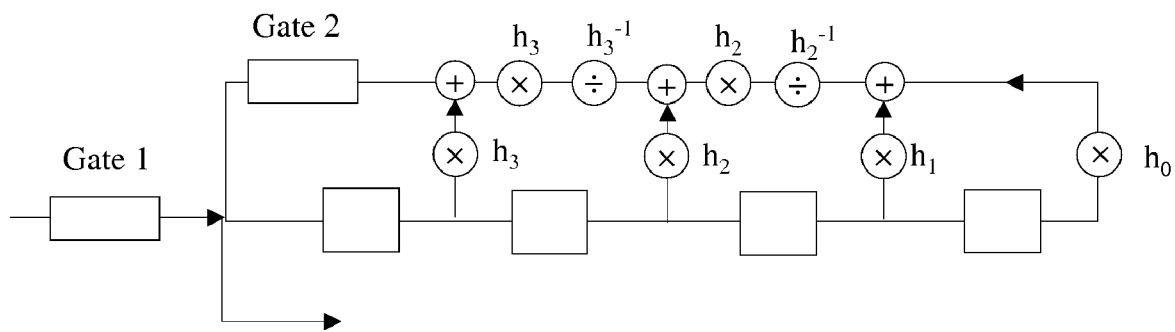
FIG. 46 is another diagram of an RS coder in accordance with an aspect of the present invention.
Figure 47:
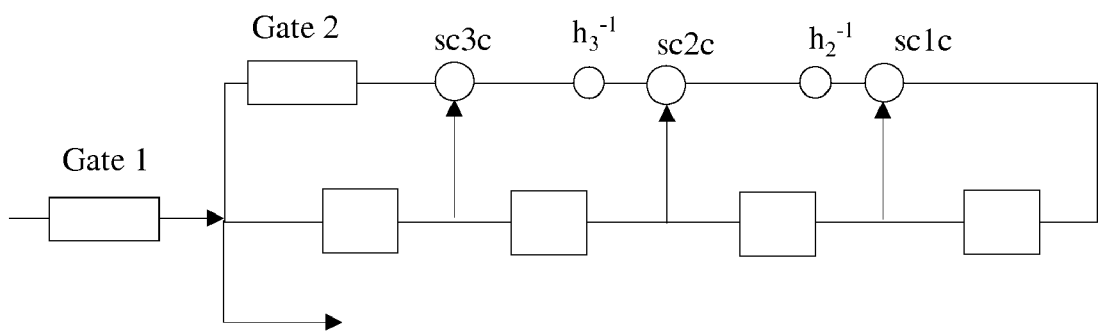
FIG. 47 is yet another diagram of an RS coder in accordance with an aspect of the present invention.
Figure 48:
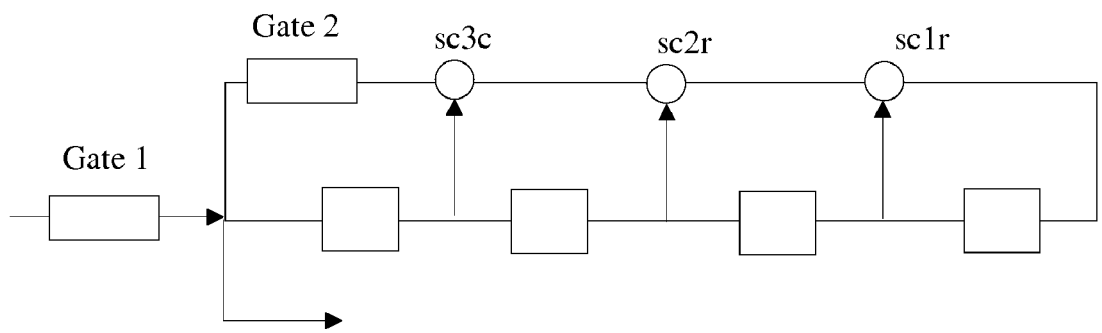
FIG. 48 is yet another diagram of an RS coder in accordance with an aspect of the present invention.

The Fibonacci configuration has an additional opportunity for simplification, which is an aspect of the present invention. Because of the asymmetrical structure of the inputs of the adders in which one input may have a multiplier and the other will certainly not have a multiplier, the reduced function is likely to become an non-commutative function. This may sometimes be a handicap as one has to be careful with the order of inputs. In accordance with an aspect of the present invention one can re-design the solution into mostly commutative functions as is shown in FIGS. 46, 47 and 48.

The first step of the method is to insert in the Fibonacci configuration, for instance as in FIG. 44, at the second input of a n-valued adder a multiplier hn. In this example that would be a multiplier h3, and a multiplier h2. The adder with h0 and h1 is already an asymmetric configuration and may be treated as a special case. To counter the insertion of a multiplier one has to insert also a 'divider' hn−1 in order to make the combination of inverters hn and $hn^{-1}$ together an identity inverter. This is shown in FIG. 47.

Assuming as an illustrative example again the 8-valued case over GF(8) with [h3 h2 h1 h0]=[2 4 2 1]. From the multiplication function one can see that h3=h1=$2_{GF(8)}$=[0 2 3 4 5 6 7 1]. And h2=$4_{GF(8)}$=[0 4 5 6 7 1 2 3]. The multipliers are 8-valued inverters. The reversing inverters for the multipliers are: $h3^{-1}$=$h1^{-1}$=[0 7 1 2 3 4 5 6] and $h2^{-1}$=[0 5 6 7 1 2 3 4]. Because the adders with h3 and h2 are now symmetrical one can reduce the combination of adders and multipliers into commutative functions sc3c and sc2c of which the truth tables are provided in the following tables.

| sc3c | 0 | 1 | 2 | 3 | 4 | 5 | 6 | 7 |
|---|---|---|---|---|---|---|---|---|
| 0 | 0 | 2 | 3 | 4 | 5 | 6 | 7 | 1 |
| 1 | 2 | 0 | 5 | 1 | 3 | 7 | 6 | 4 |
| 2 | 3 | 5 | 0 | 6 | 2 | 4 | 1 | 7 |
| 3 | 4 | 1 | 6 | 0 | 7 | 3 | 5 | 2 |
| 4 | 5 | 3 | 2 | 7 | 0 | 1 | 4 | 6 |
| 5 | 6 | 7 | 4 | 3 | 1 | 0 | 2 | 5 |
| 6 | 7 | 6 | 1 | 5 | 4 | 2 | 0 | 3 |
| 7 | 1 | 4 | 7 | 2 | 6 | 5 | 3 | 0 |

| sc2c | 0 | 1 | 2 | 3 | 4 | 5 | 6 | 7 |
|---|---|---|---|---|---|---|---|---|
| 0 | 0 | 4 | 5 | 6 | 7 | 1 | 2 | 3 |
| 1 | 4 | 0 | 7 | 3 | 5 | 2 | 1 | 6 |
| 2 | 5 | 7 | 0 | 1 | 4 | 6 | 3 | 2 |
| 3 | 6 | 3 | 1 | 0 | 2 | 5 | 7 | 4 |
| 4 | 7 | 5 | 4 | 2 | 0 | 3 | 6 | 1 |
| 5 | 1 | 2 | 6 | 5 | 3 | 0 | 4 | 7 |
| 6 | 2 | 1 | 3 | 7 | 6 | 4 | 0 | 5 |
| 7 | 3 | 6 | 2 | 4 | 1 | 7 | 5 | 0 |

The truth table of sc1c is identical to sc1, earlier provided. However one is now also left with an inverter at an input of sc3c and one at an input of sc2c. Because of the configuration one can also treat the inverters as being at the output of the preceding function. This will of course transform the truth table of that function, but leave it commutative. So the inverter $h3^{-1}$ is at the output of sc2c and the inverter $h2^{-1}$ is at the output of sc1. This will create the functions sc2r and sc1r of which the truth tables are provided in the following tables.

| sc2r | 0 | 1 | 2 | 3 | 4 | 5 | 6 | 7 |
|------|---|---|---|---|---|---|---|---|
| 0 | 0 | 3 | 4 | 5 | 6 | 7 | 1 | 2 |
| 1 | 3 | 0 | 6 | 2 | 4 | 1 | 7 | 5 |
| 2 | 4 | 6 | 0 | 7 | 3 | 5 | 2 | 1 |
| 3 | 5 | 2 | 7 | 0 | 1 | 4 | 6 | 3 |
| 4 | 6 | 4 | 3 | 1 | 0 | 2 | 5 | 7 |
| 5 | 7 | 1 | 5 | 4 | 2 | 0 | 3 | 6 |
| 6 | 1 | 7 | 2 | 6 | 5 | 3 | 0 | 4 |
| 7 | 2 | 5 | 1 | 3 | 7 | 6 | 4 | 0 |

| sc1r | 0 | 1 | 2 | 3 | 4 | 5 | 6 | 7 |
|------|---|---|---|---|---|---|---|---|
| 0 | 0 | 5 | 6 | 7 | 1 | 2 | 3 | 4 |
| 1 | 6 | 1 | 0 | 2 | 5 | 7 | 4 | 3 |
| 2 | 7 | 4 | 2 | 0 | 3 | 6 | 1 | 5 |
| 3 | 1 | 6 | 5 | 3 | 0 | 4 | 7 | 2 |
| 4 | 2 | 3 | 7 | 6 | 4 | 0 | 5 | 1 |
| 5 | 3 | 2 | 4 | 1 | 7 | 5 | 0 | 6 |
| 6 | 4 | 7 | 3 | 5 | 2 | 1 | 6 | 0 |
| 7 | 5 | 0 | 1 | 4 | 6 | 3 | 2 | 7 |

The reduced configuration is as shown in FIG. 48. Executing the LFSR with the n-valued inputs earlier provided will generate the same codewords as previously generated, demonstrating equivalence. It is easy to see that several different reduced configurations can be created without changing the fundamental approach. For instance one may leave an inverter at the place of h0 and create all commutative functions. The method here provided applies for all Fibonacci LFSRs in GF(n).

The n-valued CRC coder is a variant of the RS coders here presented. In a CRC coder one creates codewords with check symbols. Recalculating check symbols at the receiving side will determine if errors have occurred. In effect a CRC coder is an RS coder without error correction. One wants to create a codeword of p symbols of which k symbols are check symbols. In the best case an n-valued LFSR may be able to generate codewords which will have at most (n−k−1) symbols in common with other codewords. Based on the fact that with a perfect (error free) match two identical codewords have n symbols in common and only 3 if the two codewords are different, one may be able to detect up to k errors with CRC coders here provided. When there are more than k errors one may create another valid codeword and thus not be able to distinguish between a valid codeword and a word in error.

As has been shown earlier the adding functions over an extended binary finite field have a certain benefit in realizing non-binary LFSRs. While these LFSRs over an extended binary field or $GF(2^p)$ with multipliers are not as efficient as real multi-valued symbol processing methods they can fairly easy be implemented in binary logic technology. When one is using stored or look-up table like technology using adding and multipliers is certainly at a disadvantage. The reduced multipliers multi-valued functions are of course much more efficient, assuming it does not matter if one puts an adder function or any other n-valued function in a table. However if for some reason one is absolutely restricted to using binary switches and access to memory is for instance expensive or otherwise limited on can of course create n-valued LFSRs over GF(n) with adders and multipliers, as is show in for instance known RS coders.

What is novel is that one can also create n-valued scramblers and corresponding descramblers using the adders and multipliers over $GF(2^p)$. An n-valued LFSR based scrambler can be considered a continuous polynomial division. In that sense CRC coders and RS-coders may be considered a form of scrambler. The inventor believes that no "reversing" methods for n-valued methods or apparatus for LFSR scramblers with adders and multipliers are known and that the descramblers here provided are novel.

Several known attempts have been made to form multi-valued LFSR scrambler/descrambler combinations with and without multipliers. The first such disclosure known to the inventor is in U.S. Pat. No. 3,515,805 by Fracassi et al. issued on Jun. 2, 1970. Herein p-valued LFSR based scrambler/descrambler combinations are disclosed wherein modulo-p adders are used. However such descrambler cannot descramble correctly a signal that was scrambled by the scrambler. The rule for correct descrambling as disclosed by the inventor in patent application Ser. No. 10/935,960 is that scrambler and descrambler LFSRs can be the same but that the n-valued descrambling function that receives the scrambles symbols has to reverse the n-valued logic function in the scrambler that receives the n-valued symbols to be scrambled. The easiest n-valued function is a self reversing n-valued function, because its reversing function is itself. However for p>2 the mod-p adder is not self-reversing.

This mod-p approach is applied by The Mathworks in its Matlab product. The published Matlab n-valued LFSR based scrambler and corresponding descrambler do not use n-valued multipliers and are as such not optimized randomizers. In its earlier version the Matlab scrambler and descrambler were as in Fracassi all using mod-p adders (but not the multipliers). In its 2005 version The Mathworks produced a correction, now using all mod-p subtractions in the descrambler, which is still not correct. In a Matlab 2006 release The Mathworks corrected its description and replaced in the descrambler the mod-p addition by a mod-p subtraction.

Figure 49:
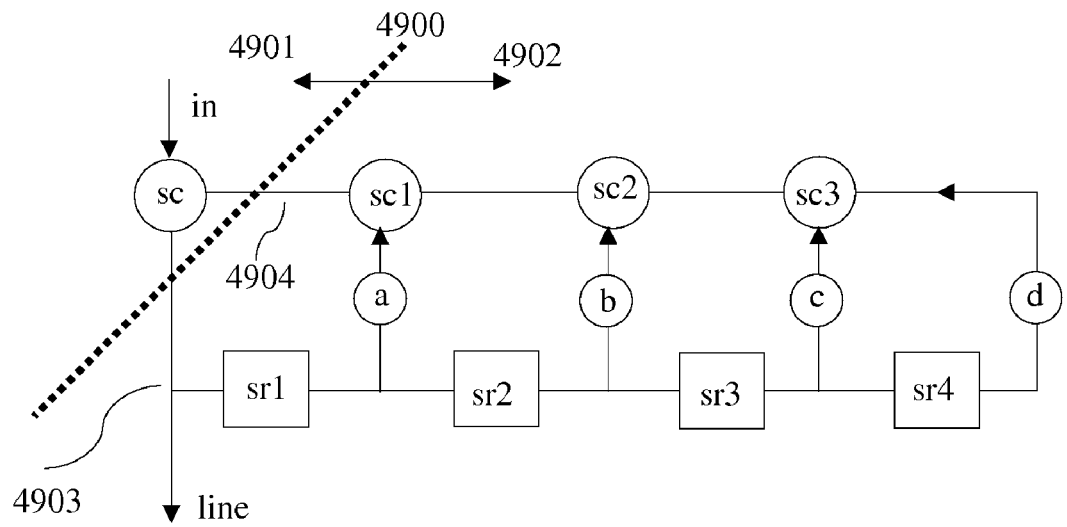
FIG. 49 is a diagram of an LFSR based scrambler in accordance with an aspect of the present invention.

The following will disclose as an aspect of the present invention the correct solution for a n-valued LFSR based scrambler/descrambler combination using adders and multipliers over GF(n). Such a generic n-valued LFSR based scrambler is shown in FIG. 49 and its corresponding self-synchronizing descrambler in FIG. 50. This is in one aspect just an illustrative example in that a shift register of 4 elements (sr1, sr2, sr3 and sr4) and 3 taps with n-valued functions sc1, sc2 and sc3 and an end-tap, with 4 n-valued multipliers a, b, c and d are used for the scrambler and the corresponding descrambler. One may change the number of shift register elements, number of taps and functions, and multipliers without changing the nature of the invention.

Now referring to FIG. 49, which is a diagram of an n-valued LFSR based scrambler. A line 4900 virtually (for analysis) divides the scrambler in two parts: the part 4901 to the left of the line, which is basically the n-valued scrambling function sc, with two inputs: an input 'in' which provides the n-valued symbols to be scrambled and an input 4904. To the right of the line 4900 is the n-valued LFSR 4902 with the shift register with elements sr1, sr2, sr3, and sr4 and functions sc1, sc2 and sc3 and multipliers a, b, c and d. The output 4904 of functions sc1 may (for the purpose of the analysis) also be considered an output of the LFSR. It should be clear that output of the LFSR and input to scrambling function sc are connected. The scrambling function sc also has an output 4903. The input to the first element of the shift register sr1 is also an input to the n-valued shift register. At the same time the output 4903 is also an output of the scrambler which provides the scrambled n-valued symbols as a signal 'line'. The output of the scrambler, the output of the scrambling function and the input to the shift register are all connected.

The whole circuit is under control of a clock signal that allows the shifting of the content of the shift register elements and which is synchronized with the input provided on 'in'. A clock signal (though not drawn) may be assumed to be present in this and all disclosed LFSR methods and circuits.

Figure 50:
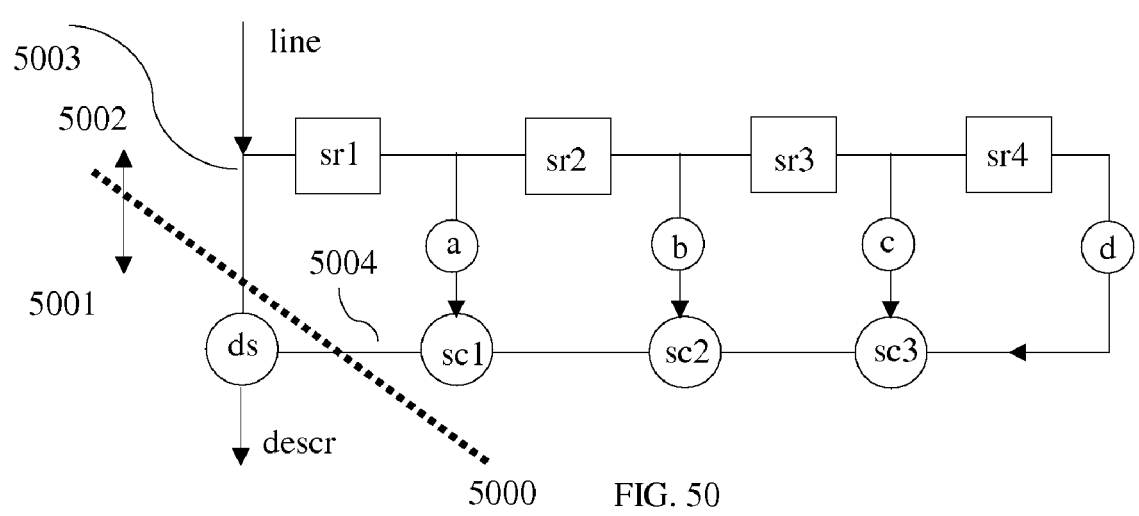
FIG. 50 is a diagram of an LFSR based descrambler in accordance with an aspect of the present invention.

The descrambler shown in diagram in FIG. 50 is in many regards the same as the scrambler. However instead of a scrambling function it has a descrambling function ds. The descrambler is divided virtually for analysis by a line 5000 in two parts: a part 5002 which is an n-valued LFSR and part 5001 which is the descrambling function. The LFSR part is in components and structure identical to the LFSR of the corresponding scrambler, with exception of the descrambler input. What was a scrambler output 'line' is a descrambler input 'line' here. The input providing the signal 'line' with scrambled n-valued symbols, the input to the shift register and an input to the descrambling function are all connected to 50003. The output 5004 of function sc1 may for the analysis also be considered an output of the LFSR and is connected to an input of descrambling function ds. The output of descrambling function ds is also the output of the descrambler and provides the descrambled n-valued symbols indicated as signal 'descr'. The signals 'in' provided on the input of the scrambler of FIG. 49 and 'descr' provided on the output of descrambler of FIG. 50 are identical when:

A. the LFSR of the n-valued scrambler and descrambler are identical or equivalent;

B. the content of the shift register at the start of scrambling and descrambling process are identical;

C. function sc of the scrambler and function ds of the descrambler are each others reverse, unless sc is self reversing, then ds is identical to sc.

Because the descrambler is self-synchronizing the initial content of the shift registers of scrambler and the descrambler may be different. In that case after the shift register of the descrambler is flushed the descrambler will provide the correct descrambled n-valued symbols.

Two LFSRs are equivalent when: after been provided with the same shift register content, its symbols on the output are identical. As was shown before, it is possible to reduce the multipliers. Accordingly one may create equivalent LFSRs. As an aspect of the present invention the function sc will be an adder over an extended binary field $GF(2^p)$ with p>1. The multipliers a, b, c and d are multipliers also over $GF(2^p)$. A multiplier over $GF(2^p)$ is an $2^p$ valued inverter which can be realized in binary logic. An adder over $GF(2^p)$ is self reversing, accordingly sc and ds will be identical.

As an illustrative example one may create a scrambler as in FIG. 49 over GF(8), wherein sc is the adder over GF(8) as previously defined and a=3 b=4 c=5 and d=6. Assume an input signal of 16 8-valued symbols in =[0 1 2 3 4 5 6 7 0 1 2 3 4 5 6 7] and the initial shift register is [2 2 3 3]. An important aspect is that the 8-valued multipliers are treated as 8-valued inverters. Using the earlier defined multiplier function over GF(8) one can check that a=$3_{GF(8)}$=[0 3 4 5 6 7 1 2]; b=$4_{GF(8)}$=[0 4 5 6 7 1 2 3]; c=$5_{GF(8)}$=[0 5 6 7 1 2 3 4]; and d=$6_{GF(8)}$=[0 6 7 1 2 3 4 5]. The result of scrambling the sequence 'in' is line=[1 7 1 6 7 5 7 5 7 7 0 6 6 4 5 2]. Descrambling 'out' with the same initial shift register will provide 'in'.

Accordingly one can create combinations of n-valued scramblers/descramblers over $GF(2^p)$ wherein the functions used are all identical and an adder over $GF(2^p)$ and the multipliers are all multipliers over $GF(2^p)$. This allows the scramblers and descramblers over $GF(2^p)$ to be easily implemented in binary logic.

As another aspect of the present invention one may actually use reversible inverters which may not be multipliers over $GF(2^p)$. As all operations over $GF(2^p)$ take place in binary technology. For example an 8-valued reversible inverter is a transformation of a first 3 bits word into another 3 bits word according to a transformation scheme provided by an 8-valued reversible transformation, which is called an 8-valued inverter. The advantage of an multiplication over $GF(2^p)$ is that one can limit one self to using XOR functions. However is should be appreciated that any 8-valued 3-bit word transformation may be implemented in binary logic. Accordingly it is possible to create n-valued scramblers/descramblers over $GF(2^p)$ with adders over $GF(2^p)$ and 8-valued reversible inverters.

As an illustrative 8-valued example one may use again the scrambler/descrambler of FIGS. 49 and 50 with all functions being an adder over GF(8), and inverters: a=[7 6 5 4 3 2 1 0], b=[6 5 4 3 2 1 0 7]; c=[5 4 3 2 1 0 7 6]; and d=[4 3 2 1 0 7 6 5]. The scrambler with the same initial content and signal 'in', will generate line=[5 7 7 4 0 0 2 2 0 0 5 7 6 1 2 5], which is of course a different result from the earlier example. The descrambler will correctly descramble 'line' into 'in'.

One may also use other reversible 8-valued functions, which can be realized in binary logic. In that case one has to take care that the functions 'sc' and 'ds' are each others reverse.

One may apply the above approach also to other n-valued functions, multipliers and inverters over $GF(q^p)$, wherein q is a prime number greater than 2 and p>1. In those cases adders may not be self reversing and one may want to select other functions that are self-reversing. Further more the advantage of the extended binary field as enabling relatively easy to implement functions over $GF(2^p)$ may no longer apply, and one may want to use simpler multiplier or inverter reduced functions.

Figure 51:
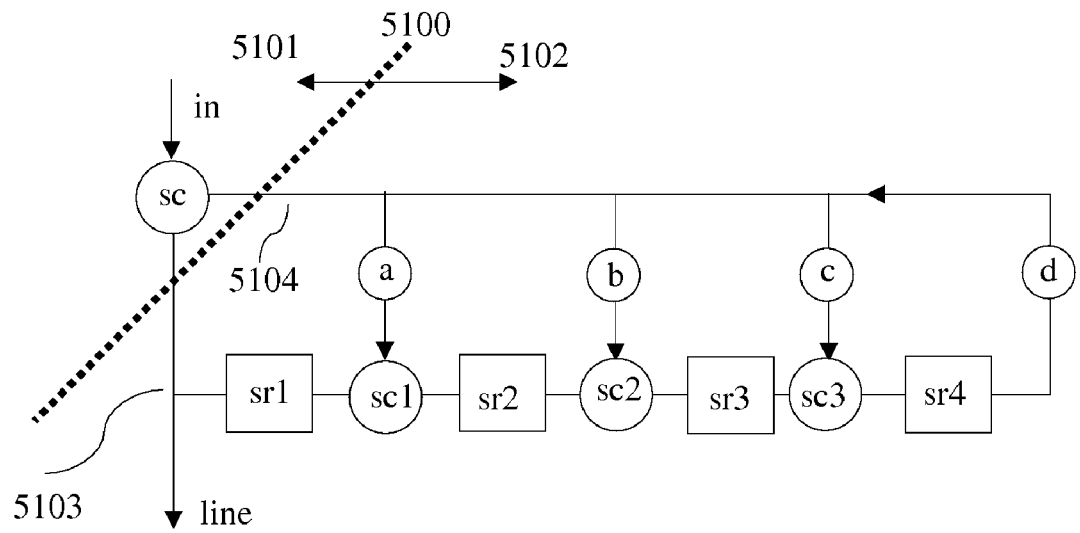
FIG. 51 is a diagram of another LFSR based scrambler in accordance with an aspect of the present invention.

The scrambler/descrambler of FIGS. 49 and 50 are examples using Fibonacci LFSRs. In accordance with another aspect of the present invention one can also create scrambler/descrambler combinations in Galois configuration as shown in FIG. 51 for the scrambler and FIG. 52 for the descrambler. In FIG. 51 a line 5100 virtually divides the scrambler in a LFSR 5102 and a scrambling function 5101. The output 5103 of the scrambling function is also the output of the scrambler and the input to the shift register. Output 5104 of a n-valued reversible function in the LFSR is also an input to the scrambling function. A signal 'in' with n-valued symbols to be scrambled is inputted on the scrambling function. Herein a, b, c and d are n-valued inverters, while functions sc, sc1, sc2 and sc3 are adders over $GF(2^p)$. In one embodiment the inverters a, b, c and d are also multipliers over $GF(2^p)$. The inverter/multiplier d is usually 1 or the identity inverter, though it may be any n-valued reversible inverter. Using the example with the same input and initial shift register content and with that a=$3_{GF(8)}$=[0 3 4 5 6 7 1 2]; b=$4^{GF(8)}$=[0 4 5 6 7 1 2 3]; c=$5_{GF(8)}$=[0 5 6 7 1 2 3 4]; and d=$1_{GF(8)}$=[0 1 2 3 4 5 6 7]. The signal line generated is then: line=[3 0 1 2 3 3 5 5 7 6 7 7 6 5 1 3].

Figure 52:
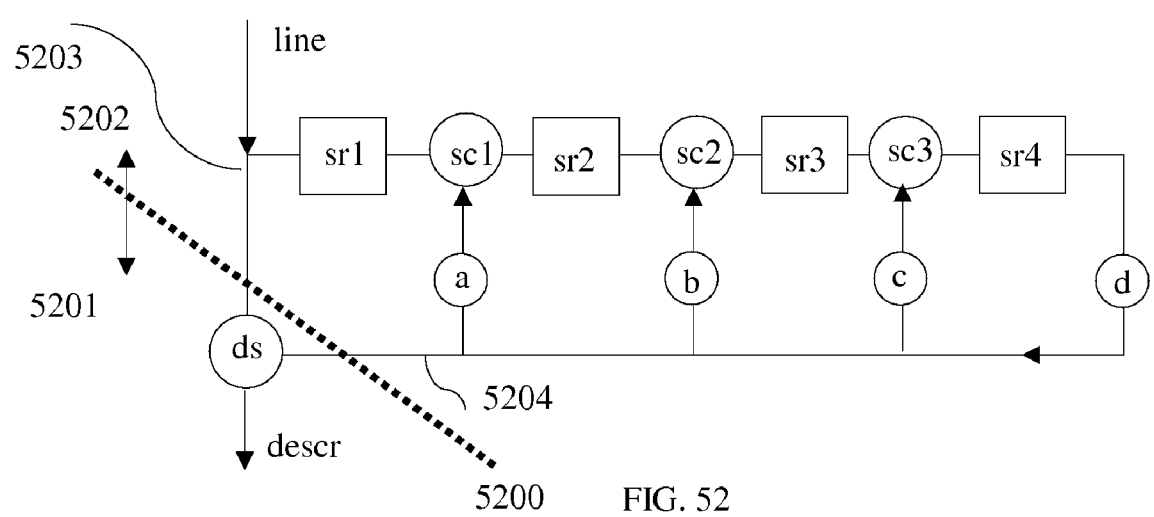
FIG. 52 is a diagram of another LFSR based descrambler in accordance with an aspect of the present invention.

The corresponding descrambler is shown in diagram in FIG. 52. Again one can divide the descrambler by a virtual line 5200 in a descrambling function 5201 and LFSR 5202; and with input/output 5203 and 5204. All functions are adders over GF(8) and the value of the multipliers are the same as in the corresponding scrambler.

All possible conditions and configurations as provided for the Fibonacci scrambler/descrambler apply to the Galois scrambler/descrambler. The only exception is that the descrambler is not self-synchronizing. One can create different Galois configurations by placing the scrambling functions in different position than shown in FIG. 52. This will not affect the basic assumptions about use of adders, n-valued functions, multipliers and inverters.

One configuration was not shown. That is a configuration wherein a multiplier or inverter is placed in the output of the scrambling or descrambling function. This is possible and fully contemplated. However in general such a function will not be self-reversing. A matching reversing function then will require at least one reversible inverter at an input.

It is another aspect of the present invention to apply coders, including error detecting and error correcting coders, which have LFSRs with a reduced number of multipliers according to aspects of the present invention in a system, or that have a scrambler/descrambler combination with an LFSR having at least one adder over $GF(n=2^p)$ and at least one reversible n-valued inverter at an input of the adder. A system using the methods and apparatus as aspects of the present invention may be an error correcting system or an error detecting system, which may further be part of a data storage system, including using an optical disk, a magnetic disk or magnetic tape, or mass memories such as flash memory. It may also be a communication system such as a wired or a wireless system, including mobile phone, wireless network, fixed network or an optical cable network. The system may also be a coding and/or decoding application for digital rights management.

In the present invention the concept of multiplier reduction is used. This is equivalent to inverter reduction, as multipliers herein are defined in $GF(n)$ and may be designated as being n-valued inverters.

A method here provided as an aspect of the present invention may be implemented on a processor that executes instructions. The processor may be a micro-processor a customized or dedicated processor or a general digital signal processor. A/D and D/A converters may be included for inputting non-binary and outputting non-binary signals, while processing in binary format. In a further embodiment one may also use memory based circuits. One may also use customized circuits.

It is another aspect of the present invention to implement truth tables, memories, LFSRs and switches in non-binary technology and generate and processes n-valued symbols as non-binary signals. Additional benefits will be achieved by using actual n-valued switching circuits. There are different electronic n-valued switching technologies available. For instance implemented in CMOS as disclosed by Dan Olson. In U.S. Pat. No. 6,133,754 by Olson, issued Oct. 17, 2000 entitled "MULTIPLE-VALUED LOGIC CIRCUIT ARCHITECTURE; SUPPLEMENTARY SYMMETRICAL LOGIC CIRCUIT STRUCTURE (SUS-LOC)" embodiments of n-valued CMOS switches. N-valued logic functions are disclosed in U.S. patent application Ser. No. 11/000,218 filed Nov. 30, 2004 entitled "SINGLE AND COMPOSITE BINARY AND MULTI-VALUED LOGIC FUNCTIONS FROM GATES AND INVERTERS" which is incorporated herein by reference in its entirety. Herein it is shown how n-valued logic circuits can be created. N-valued logic embodiments, for instance using look-up tables are also contemplated. Further more n-valued memory devices are disclosed by the inventor in U.S. patent application Ser. No. 11/139,835 filed on May 27, 2005 entitled MULTI-VALUED DIGITAL INFORMATION RETAINING ELEMENTS AND MEMORY DEVICES, which is incorporated herein by reference in its entirety.

While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

The invention claimed is:

1. A method for performing a finite field polynomial calculation over $GF(n)$ with $n>2$ on k n-valued symbols with $k>1$ comprising:
    providing the k n-valued symbols on an input to an n-valued Linear Feedback Shift Register (LFSR), the LFSR including a non-commutative n-valued logic function with at least two inputs; which is not a modulo-n subtraction and that is implemented as a look-up table; and
    providing an n-valued symbol which is defined by the finite field polynomial calculation over $GF(n)$ on an output of the LFSR.

2. The method as claimed in claim_1, wherein an n-valued symbol is represented by binary symbols.

3. The method as claimed in claim 1, wherein $GF(n)$ is an extension finite field $GF(p^q)$ with p a prime integer and $p \geq 2$ and q an integer with $q>1$.

4. The method as claimed in claim 1, wherein the finite field polynomial calculation is a division.

5. The method as claimed in claim 1, wherein the LFSR is in Galois configuration.

6. The method as claimed in claim 1, wherein the steps of claim 1 are performed in an n-valued coder.

7. The method as claimed in claim 6, wherein the n-valued coder is a Reed Solomon coder.

8. An n-valued coder with $n>2$ enabled for performing a finite field polynomial calculation over $GF(n)$ on k n-valued symbols with $k>1$ comprising:
    an input, enabled to receive n-valued symbols;
    an n-valued Linear Feedback Shift Register (LFSR) that includes a non-commutative n-valued logic function with at least two inputs not being a modulo-n subtraction that is implemented as a non-commutative truth table in an addressable memory, the n-valued logic function having at least two inputs and an output; and
    an output, enabled to provide a n-valued symbol which is defined by the finite field polynomial calculation over $GF(n)$.

9. The n-valued coder as claimed in claim 8, wherein an n-valued symbol is represented by binary symbols.

10. The n-valued coder as claimed in claim 8, wherein $GF(n)$ is an extension finite field $GF(p^q)$ with p a prime integer and $p \geq 2$ and q an integer with $q>1$.

11. The n-valued coder as claimed in claim 8, wherein the n-valued coder is a Reed Solomon coder.

12. The n-valued coder as claimed in claim 8, wherein the LFSR is in Galois configuration.

13. The n-valued coder as claimed in claim 8, wherein the finite field polynomial calculation over $GF(n)$ is a division.

14. A system having a n-valued coder with $n>4$ enabled for performing a finite field polynomial calculation over $GF(n)$ on k n-valued symbols with $k>1$, the n-valued coder comprising:
    an input, enabled to receive k n-valued symbols;

an n-valued Linear Feedback Shift Register (LFSR) including a non-commutative n-valued logic function which is not a modulo-n subtraction, the non-commutative n-valued logic function having at least two inputs and an output and that is implemented in an addressable memory; and an output, enabled to provide an n-valued symbol in accordance with the finite field polynomial calculation over GF(n).

15. The system as claimed in claim 14, wherein an n-valued symbol is represented by binary symbols.

16. The system as claimed in claim 14, wherein GF(n) is an extension finite field $GF(p^q)$ with p a prime integer and $p \geq 2$ and q an integer with $q > 1$.

17. The system as claimed in claim 14, wherein the n-valued coder is a Reed Solomon coder.

18. The system as claimed in claim 14, wherein the system is a communication system.

19. The system as claimed in claim 14, wherein the system is a data storage system.

* * * * *